(12) United States Patent
Niikura et al.

(10) Patent No.: US 10,681,130 B2
(45) Date of Patent: Jun. 9, 2020

(54) STORAGE SYSTEM INCLUDING A PLURALITY OF NODES

(71) Applicant: Toshiba Memory Corporation, Tokyo (JP)

(72) Inventors: Hisaki Niikura, Tokyo (JP); Kazunari Kawamura, Tokyo (JP); Takahiro Kurita, Kanagawa (JP); Kazunari Sumiyoshi, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 352 days.

(21) Appl. No.: 15/444,255

(22) Filed: Feb. 27, 2017

(65) Prior Publication Data

US 2018/0077236 A1 Mar. 15, 2018

(30) Foreign Application Priority Data

Sep. 9, 2016 (JP) ................................. 2016-176841

(51) Int. Cl.
*G06F 15/16* (2006.01)
*H04L 29/08* (2006.01)
(Continued)

(52) U.S. Cl.
CPC .......... *H04L 67/1097* (2013.01); *G06F 3/061* (2013.01); *G06F 3/067* (2013.01); *G06F 3/0611* (2013.01); *G06F 3/0635* (2013.01); *G06F 3/0653* (2013.01); *G06F 3/0659* (2013.01); *H04L 47/11* (2013.01)

(58) Field of Classification Search
CPC ............ H04N 21/431; H04N 21/4316; H04N 21/4886; H04N 21/4622
See application file for complete search history.

(56) References Cited

U.S. PATENT DOCUMENTS 8,365,023 B2  1/2013  Chiu et al.
9,246,709 B2  1/2016  Tatsumura et al.
(Continued)

FOREIGN PATENT DOCUMENTS

JP  2015-041291 A  2/1990
JP  H02-056031 A  2/1990
(Continued)

OTHER PUBLICATIONS

Japanese Office Action dated Jul. 23, 2019, filed in counterpart Japanese Patent Application No. 2016-176841, 16 pages (with English translation).

*Primary Examiner* — John B Walsh
(74) *Attorney, Agent, or Firm* — Kim & Stewart LLP

(57) ABSTRACT

A storage system includes a plurality of nodes, each of the nodes including one or more node modules each of which includes a nonvolatile storage, and a connection unit directly connectable to at least one of the nodes. The connection unit is configured to transmit an access request or an inquiry directed to a target node module, determine a length of an interval before re-transmitting the access request or the inquiry, based on a response indicating an operation status of the target node module, which is returned by the target node module in response to the access request or the inquiry, and re-transmits the access request or the inquiry after the interval of the determined length has passed.

20 Claims, 27 Drawing Sheets

(51) Int. Cl.
*G06F 3/06* (2006.01)
*H04L 12/801* (2013.01)

(56) References Cited

U.S. PATENT DOCUMENTS

| | | | |
|---|---|---|---|
| 2005/0229182 A1 | 10/2005 | Grover et al. | |
| 2009/0248975 A1* | 10/2009 | Daud | G06F 11/0709 |
| | | | 711/112 |
| 2010/0318996 A1* | 12/2010 | Harris | G06F 9/5033 |
| | | | 718/102 |
| 2013/0342931 A1* | 12/2013 | Grobis | G11B 19/045 |
| | | | 360/77.02 |
| 2014/0215129 A1 | 7/2014 | Kuzmin et al. | |
| 2015/0026525 A1* | 1/2015 | Byrne | G06F 11/079 |
| | | | 714/39 |
| 2015/0143167 A1 | 5/2015 | Maeda et al. | |
| 2015/0227320 A1 | 8/2015 | Kinoshita et al. | |
| 2016/0011791 A1 | 1/2016 | Sawada | |

FOREIGN PATENT DOCUMENTS

| | | |
|---|---|---|
| JP | 2006-129125 A | 5/2006 |
| JP | 2010146191 A | 7/2010 |
| JP | 2012-103926 A | 5/2012 |
| JP | 2014502395 A | 1/2014 |
| JP | 2015099438 A | 5/2015 |
| JP | 2015152949 A | 8/2015 |
| JP | 2016018384 A | 2/2016 |
| WO | 2012146998 A1 | 11/2012 |
| WO | 2013076795 A1 | 5/2013 |

\* cited by examiner

STORAGE SYSTEM INCLUDING A PLURALITY OF NODES

CROSS-REFERENCE TO RELATED APPLICATION

This application is based upon and claims the benefit of priority from Japanese Patent Application No. 2016-176841, filed Sep. 9, 2016, the entire contents of which are incorporated herein by reference.

FIELD

Embodiments described herein relate generally to a storage system.

BACKGROUND

A storage system of one type includes multiple storage devices that are networked and each of which includes a nonvolatile storage such as a flash memory. Such a storage system can be connected to multiple clients, and a command from a client is transmitted to one of the storage devices.

In such a storage system, commands from a plurality of clients may be directed to a same storage device. In this case, since the plurality of commands has to be processed by the storage device, all command may not be executed in a timely manner. In such cases, the storage device replies with a busy response indicating that the commands cannot be accepted (busy state). Since the timing at which the busy state ends cannot be predicted, when the busy response is replied, non-accepted commands may be repeatedly transmitted until accepted. This repeated transmission of the non-accepted commands may congest data traffic among the multiple storage devices and increase latency of the entire storage system.

DETAILED DESCRIPTION

Figure 1:
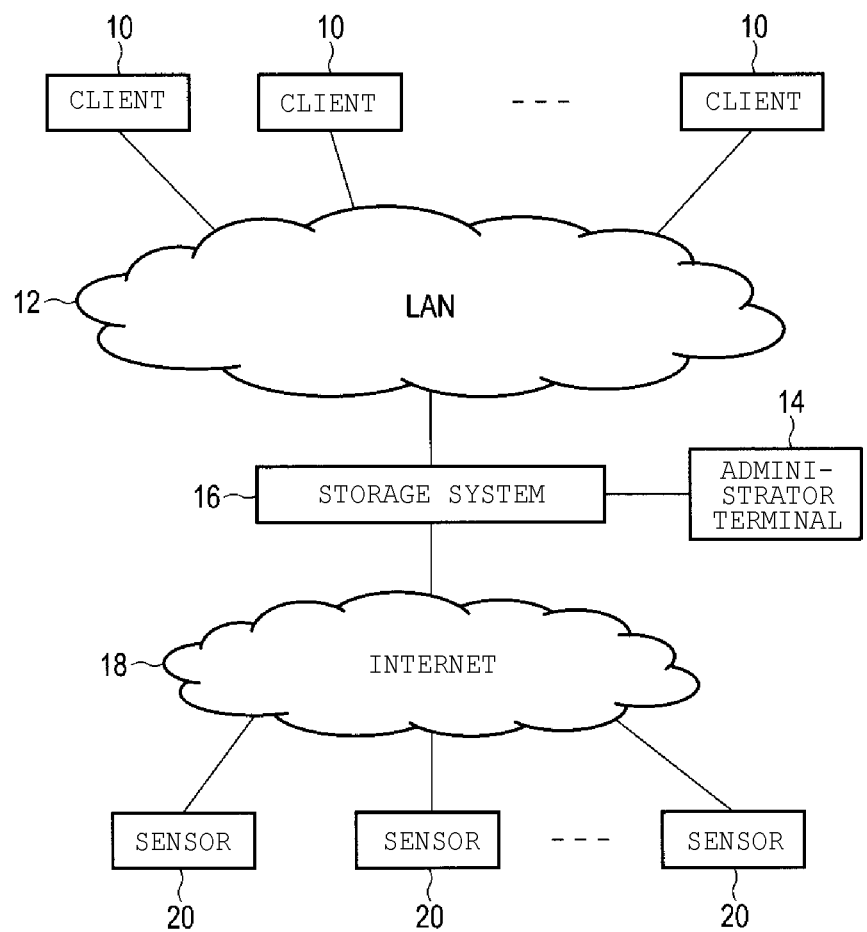
FIG. 1 is a block diagram of an entire system including a storage system according to an embodiment.

An embodiment provides a method of improving a delay time and throughput by using responses returned from a storage device.

According to an embodiment, a storage system includes a plurality of nodes, each of the nodes including one or more node modules each of which includes a nonvolatile storage, and a connection unit directly connectable to at least one of the nodes. The connection unit is configured to transmit an access request or an inquiry directed to a target node module, determine a length of an interval before re-transmitting the access request or the inquiry, based on a response indicating an operation status of the target node module, which is returned by the target node module in response to the access request or the inquiry, and re-transmits the access request or the inquiry after the interval of the determined length has passed.

Hereinafter, embodiments will be described with reference to the drawings. In description presented below, a same reference numeral will be assigned to functions and elements that are substantially the same, and duplicate description thereof may not be presented. While there are cases where a plurality of representation examples is assigned to several elements, such representation examples are merely examples, and such an element may be represented using another representation example. In addition, an element to which a plurality of representation examples is not assigned may be represented using another representation example.

First Embodiment

[Overall Configuration]

FIG. 1 is a block diagram of a storage system according to a first embodiment, for example, a big data analysis system. Multiple client terminals (hereinafter, simply referred to as clients) 10 and a storage system 16 are connected to a LAN 12. The storage system 16 includes multiple nonvolatile semiconductor memories each of which includes a flash memory or the like. The multiple clients 10 may be directly connected to the storage system 16 without using the LAN 12. While an administrator terminal 14 is directly connected to the storage system 16 in FIG. 1, the administrator terminal 14 may be connected to the storage system 16 via the LAN 12. Each client 10 reads desired data from the storage system 16 or writes processed data into the storage system 16 by accessing the storage system 16. The storage system 16 is also connected to the Internet 18, and sense data acquired by multiple sensors 20 connected to the Internet 18 is stored in the storage system 16.

[Storage System 16]

Figure 2:
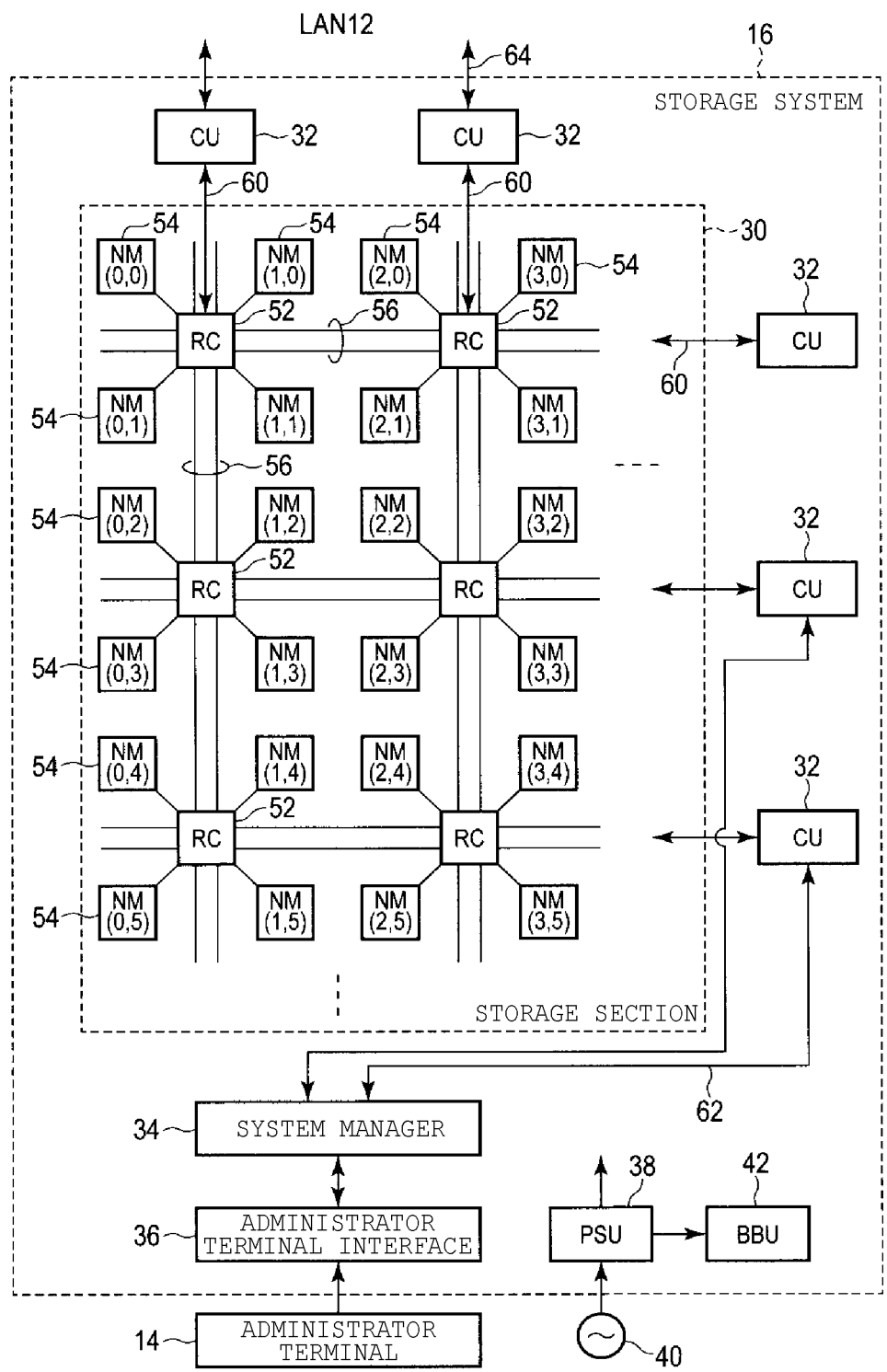
FIG. 2 schematically illustrates a configuration of a storage system according to a first embodiment.

FIG. 2 illustrates an example of the storage system 16. The storage system 16 includes a storage unit 30, multiple connection units (CU) 32, a system manager 34, a administrator terminal interface 36, a power supplying unit (PSU) 38, a battery backup unit (BBU) 42, and the like, but is not limited to such a configuration.

The storage unit 30 includes multiple node modules (NM) 54, for example, arranged in a matrix layout and multiple routing circuits (RC) 52 each of which is connected to a predetermined number of, for example, four node modules 54. In other words, each routing circuit 52 manages a predetermined number of node modules 54, and the number of the routing circuits 52 is "1/the predetermined number of the node modules 54". A network configured in a matrix layout is a network configured in a meshed pattern or a grid pattern and is a network in which communication nodes are located at intersections at which a plurality of vertical lines and a plurality of horizontal lines intersect each other, and the vertical lines and the horizontal lines serve as communication routes. Here, the shape of the arrangement is not limited to the matrix layout.

Each node module 54 is a storage unit that includes a nonvolatile semiconductor memory and stores data in accordance with a direction from the client 10. While details of the node module 54 will be described below, the node module 54 is electrically connected to another node module 54 via a routing circuit 52 and a packet management unit (PMU) 90 illustrated in FIG. 5.

The routing circuit 52 includes two or more interface, one of which is connected to another routing circuit 52 via a signal line 56, for example, a signal line of a low voltage differential signaling (LVDS) standard, and another one of which is connected to the connection unit 32 via a signal line 60, for example, a signal line of a PCI Express (PCIe) standard. The above interface standards are examples, and any other interface standard can be applied as is necessary.

The routing circuit 52 transmits a packet including data transmitted from the connection unit 32 or transmitted from another routing circuit 52 to the other routing circuit 52 using the network of the matrix layout that is formed by the signal lines 56 and 60.

In the example of the storage unit 30 illustrated in FIG. 2, an example of the network of the matrix layout in which node modules 54 correspond to communication nodes arranged at lattice points is illustrated. The coordinates of the lattice points are represented using coordinates (x, y) of a decimal number denotation. Here, position information of the node module 54 arranged at each lattice point is represented using a relative node address (xd, yd) (=decimal number denotation) corresponding to the coordinates of the lattice point. In FIG. 2, the node module 54 positioned at the upper left corner has a node address (0, 0) of the origin. The node module 54 having a node address (xd, yd) may be also referred to as NM(xd, yd). The relative node address of each node module 54 is increased or decreased as integer values of the horizontal direction (x direction) and the vertical direction (y direction) are changed.

Each node module 54 is connected to the node modules 54 adjacent in two or more different directions. For example, NM(0, 0) positioned at the uppermost left corner is connected to NM(1, 0) adjacent in X direction, NM(0, 1) adjacent in Y direction different from X direction, and NM(1, 1) adjacent in a diagonal direction via the routing circuit 52.

In the storage unit 30 configured as above, the routing circuits 52 are connected via the signal lines 56, the routing circuits 52 and a plurality of the node modules 54 are connected, whereby a network among the node modules 54 is formed. For this reason, this entire network can be regarded as a single huge nonvolatile semiconductor memory that can be accessed in one address space. Since memory space of this huge nonvolatile semiconductor memory can be shared by multiple connection units and multiple clients, the storage unit 30 can store data to be distributed in the multiple node modules 54 and process data in a distributed and parallel manner.

The shape of the network is not limited to the shape described above. For example, the network may be formed by directly connecting the node modules 54 not through the routing circuits 52.

In FIG. 2, while the multiple node modules 54 are arranged at lattice points of a square lattice, the form of the arrangement of the node modules 54 is not limited to that illustrated in this example. The shape of the lattice may be any shape in which each node module 54 arranged at a lattice point is connected to node modules 54 adjacent in two or more different directions and, for example, may be a triangle, a hexagon, or the like. In addition, while the multiple node modules 54 are arranged in a two-dimensional pattern in FIG. 2, the multiple node modules 54 may be arranged in a three-dimensional pattern. In a case where the node modules 54 are arranged in a three-dimensional pattern, the position information of each node module 54 is represented as a node address (xd, yd, zd).

As illustrated in FIG. 2, in a case where the node modules 54 are arranged in a two-dimensional pattern, by connecting the node modules 54 positioned on opposite sides, the node modules 54 may be connected in a torus shape. The torus shape is a shape in which node modules 54 are cyclically connected, and, as routes from a certain node module 54 to another node module 54, at least two routes including a route of a first direction and a second route turning in a direction opposite to the first direction are present.

The connection unit 32 includes connectors connectable to an arbitrary number of clients 10 via the LAN 12. The client 10 is used by a user using the storage system 16. The number of the connection units 32 can be configured to be arbitrary. The connection unit 32 includes a plurality of, for example, two connection ports and is connected to two different routing circuits 52. The connection port will be described in detail in a fourth embodiment with reference to FIGS. 20 and 21 below. In a case where the connection unit 32 is connected to a routing circuit 52 other than the two routing circuits, the connection unit 32 is indirectly connected through the other routing circuits 52. Here, one routing circuit 52 may be directly connected to a plurality of connection units 32.

The client 10 transmits commands for the storage system 16 such as a read command, a write command, or an erase command to one connection unit 32 via the LAN 12 in a form of a packet. The connection unit 32 that has received a command transmits a request corresponding to the received command to the node module 54 of an address corresponding to address designation information included in the command via the signal line 56 between the node modules 54 and the routing circuit 52. When the connection unit 32 transmits a request to the node module 54 in the process of a command transmitted from the client 10, the connection unit 32 generates a packet that can be transmitted or executed by the routing circuit 52 and transmits the generated packet to the routing circuits 52 that are directly connected. In a case where the received packet is not a packet addressed to node modules managed by the routing circuit 52, the routing circuit 52 transfers the packet to a neighboring routing circuit 52. In this way, the packet is transmitted to the routing circuit 52 managing the node module 54 of a transmission destination. In addition, the connection unit 32 acquires data requested by a read request from the node module 54 of an address corresponding to address designation information included in a command through the routing circuit 52 and the signal line 56 and transmits the acquired data to the client 10.

The system manager 34 is electrically connected to the connection units 32 and the routing circuits 52. The system manager 34 and the routing circuits 52 are connected through signal lines of the PCIe standard or an inter-integrated circuit (I2C) standard. The system manager 34 may be achieved by a processor such as a central processing unit (CPU) executing a program stored in a program memory or may be achieved hardware such as large scale integration (LSI) or an application specific integrated circuit (ASIC) having a function similar to the execution of the program executed by the processor.

The system manager 34 includes a base management controller (BMC) (not illustrated in the drawing). The BMC has functions of performing monitoring an ambient temperature, monitoring and control of the rotation number of a cooling fan (not illustrated in the drawing), monitoring and control of a power supply current and a power supply voltage, recording a status of the connection unit 32, monitoring a temperature, reset, and the like. The system manager 34, other than the BMC function, may perform a process (background process) for the storage unit 30. However, the background process is arbitrary. For example, in a case where the node module 54 uses a NAND flash memory, the system manager 34 may perform garbage collection or wear levelling of the flash memory. When a failure in the node module 54 is found, the system manager 34 may notify an external unit such as the administrator terminal 14 of replacement of a card board in which the node module 54 that has failed is mounted through the connection unit 32. After the replacement of the card board, the system manager 34 may rebuild a redundant array of inexpensive disks (RAID).

Figure 6:
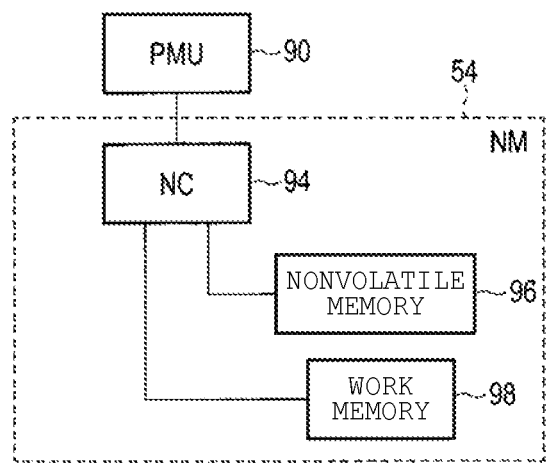
FIG. 6 is a block diagram of a node module in the storage unit included in the storage system according to the first embodiment.

The detection of a failure in the node module 54 may be performed by a node controller (NC) 94 arranged inside the node module 54 illustrated in FIG. 6 or the connection unit 32. The detection of a failure in the node module 54 may be performed based on error detection for data read from a memory included in the node module 54.

In order to perform a process for a memory included in the node module 54, the system manager 34 issues a packet according to the process. The system manager 34, for example, issues a packet that is compliant with a form illustrated in FIG. 7 to be described below.

The administrator terminal interface 36 connects the system manager 34 and the administrator terminal 14. The administrator terminal 14 is used by an administrator of the storage system 16. The administrator terminal 14 provides an interface such as a graphical user interface (GUI) for an administrator and transmits a command for the storage system 16 to the system manager 34.

The power supplying unit 38 converts an external power supply voltage given from an external power supply 40 into a predetermined DC voltage and supplies the DC voltage to each element of the storage system 16. The external power supply 40, for example, is an AC power supply of 100 V, 200 V, or the like.

The battery backup unit 42 includes a secondary battery and accumulates power supplied from the power supplying unit 38. In a case where the storage system 16 is electrically cut off from the external power supply 40, the battery backup unit 42 supplies an auxiliary power supply voltage to each element of the storage system 16. A node controller (NC) 94 of the node module 54 performs backup protecting data using the auxiliary power supply voltage.

[Connection Unit 32]

Figure 3:
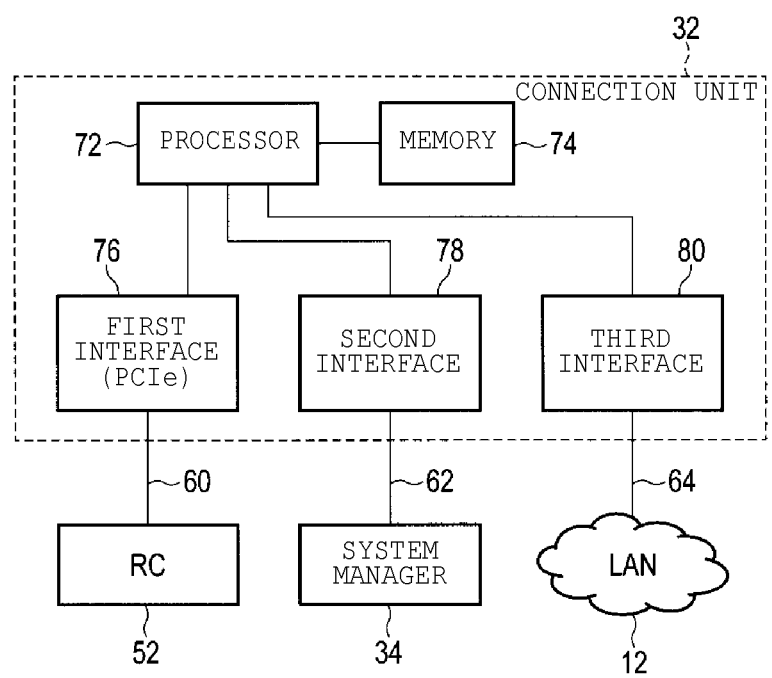
FIG. 3 is a block diagram of a connection unit included in the storage system according to the first embodiment.

FIG. 3 is a block diagram of the connection unit 32. The connection unit 32 includes a processor 72 such as a CPU, a first interface 76, a second interface 78, a memory 74, and a third interface 80, but is not limited to such a configuration.

The processor 72 performs various processes by performing application programs using the memory 74 as a work area. The first interface 76 is an interface of the PCIe standard connected to the routing circuit 52 through the signal line 60. The second interface 78 is connected to the system manager 34 through the signal line 62. The memory 74 is a work memory that temporarily stores data. The memory 74, for example, is a RAM but is not limited thereto and may use various kinds of memory. The memory 74 may include a plurality of memories. The third interface 80 is connected to the LAN 12 through the signal line 64.

The memory 74 includes a queue of an I/O request transmitted to the node module 54, and the connection unit 32 can accept requests from a plurality of clients 10.

[Storage Unit 30]

Figure 4:
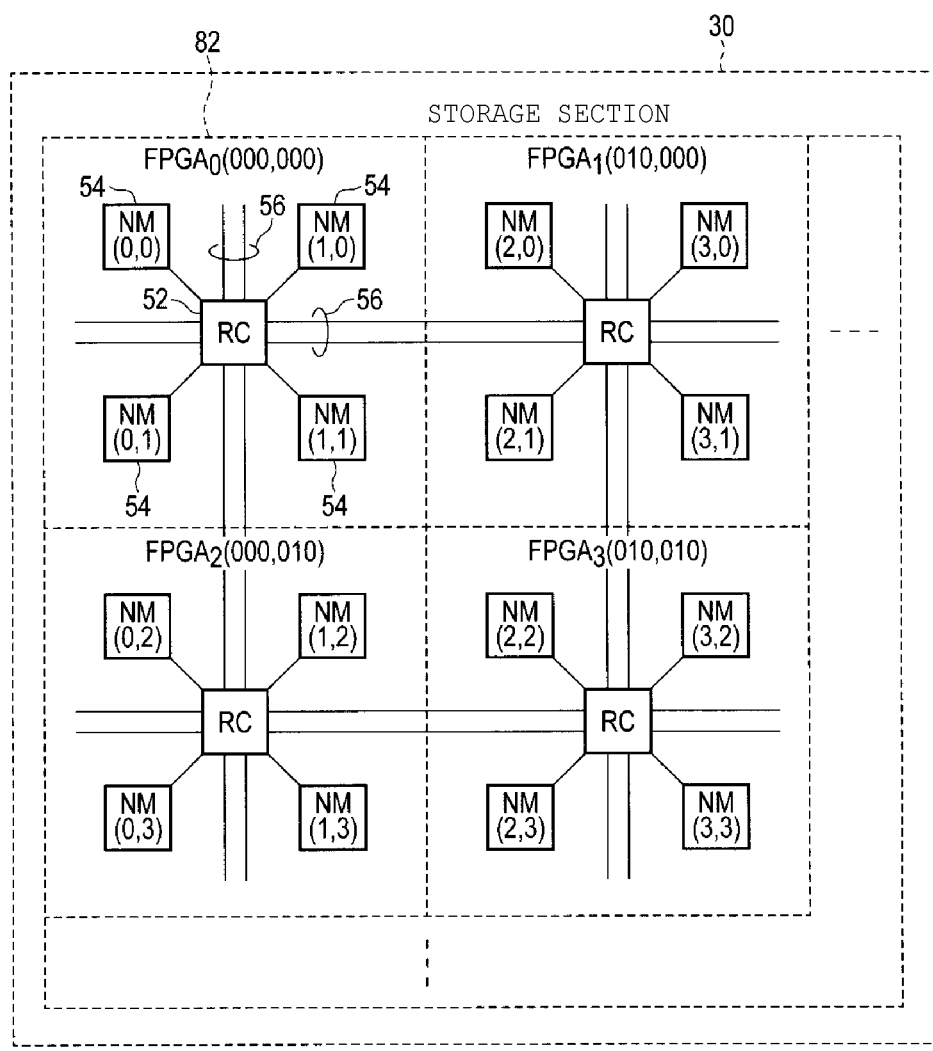
FIG. 4 schematically illustrates a configuration of a storage unit included in the storage system according to the first embodiment.

FIG. 4 illustrates details of the storage unit 30. The routing circuit 52 managing four node modules 54 includes a field-programmable gate array (FPGA). For convenience of description, one routing circuit 52 and four node modules 54 will be referred to as one FPGA 82. An $FPGA_0$ 82 positioned at the upper left side includes one routing circuit 52 and four node modules NM(0, 0), NM(1, 0), NM(0, 1), and NM(1, 1). Similarly, an $FPGA_1$ 82 includes one routing circuit 52 and four node modules NM(2, 0), NM(3, 0), NM(2, 1), and NM(3, 1). For convenience of description, four FPGAs of the storage unit 30 are given as an example, and four FPGAs addresses of $FPGA_0$ to $FPGA_3$ are represented as (000, 000), (010, 000), (000, 010), and (010, 010) in binary denotations. The FPGA addresses are addresses used for relaying a packet at the time of routing.

Figure 5:
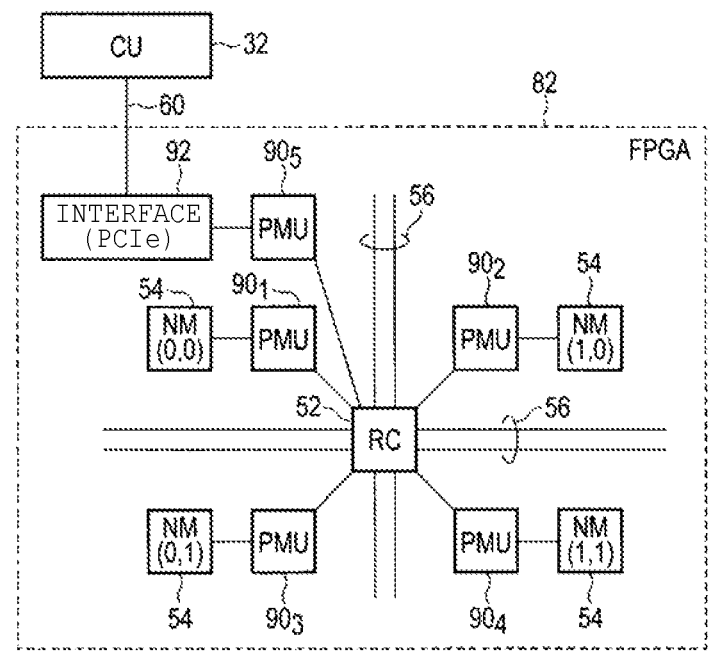
FIG. 5 schematically illustrates a configuration of an FPGA in the storage unit included in the storage system according to the first embodiment.

One routing circuit 52 of each FPGA and four node modules 54 are connected to each other through a packet management unit 90 illustrated in FIG. 5. The routing circuit 52, in a packet transmitting operation, performs routing in disregard (masking) of least significant bits of destinations x, y of the FPGA address. The FPGA address is used only for routing, and a node address is used for an actual destination and a transmission source. By masking the least significant bits of the node address, the address of the FPGA to which the node belongs is acquired.

[FPGA 82]

FIG. 5 is a block diagram of the FPGA 82. The FPGA 82, for example, in addition to one routing circuit 52 and four node modules 54, includes five packet management units (PMU) $90_1$ to $90_5$ and a PCIe interface 92, but is not limited to such a configuration.

Four packet management units $90_1$ to $90_4$ are respectively connected to four node modules NM(0, 0), NM(1, 0), NM(0, 1), and NM(1, 1), and the packet management unit $90_5$ is connected to the PCIe interface 92. Packets received by the routing circuit 52 are supplied to the packet management units $90_1$ to $90_4$ and are analyzed. Each of the packet management units $90_1$ to $90_4$ determines whether coordinates (relative node address) of a transmission destination included in the packet and coordinates (relative node address) of a node module connected to the packet management unit coincide with each other. Each of the packet management units $90_1$ to $90_4$, in a case where the transmission destination address described in the packet and the address of the node module connected to the packet management unit coincide with each other, transmits the packet to the node module 54 connected thereto. On the other hand, each of the packet management units $90_1$ to $90_4$, in a case where the coordinates described in the packet and the coordinates of the packet management unit do not coincide with each other (in case of different coordinates), replies an indication thereof to the routing circuit 52. In a case where indications representing no-coincidence of the coordinates are notified from the four packet management units $90_1$ to $90_4$, the routing circuit 52 transfers the packet to another routing circuit 52. The transmission algorithm will be described below in detail.

For example, in a case where the transmission destination node address of the packet is (1, 1), the packet management unit $90_4$ connected to the node address (1, 1) determines that the coordinates (1, 1) described in the analyzed packet and the coordinates (1, 1) of the node module connected to the packet management unit $90_4$ coincide with each other. For this reason, the packet management unit $90_4$ connected to the node address (1, 1) transmits the analyzed packet to the node module NM(1, 1) of the node address (1, 1) connected to the packet management unit $90_4$. The transmitted packet is analyzed by the node controller 94 (illustrated in FIG. 6) of the node module 54. In this way, the FPGA 82 performs a process according to a request described in the packet such as storing of data in a nonvolatile semiconductor memory included in the node module 54 by using the node controller 94 or the like.

The PCIe interface 92 transmits a request, a packet, or the like directly transmitted from the connection unit 32 to the packet management unit $90_5$. The routing circuit 52 analyzes a request or a packet stored in the packet management unit $90_5$ and transmits the request or the packet to the packet management units $90_1$ to $90_4$ connected to the routing circuit 52 or any other node module 54 based on a result of the analysis.

[Node Module]

FIG. 6 is a block diagram of the node module 54. The node module 54 includes a node controller 94, a nonvolatile semiconductor memory 96, and a work memory 98, but is not limited to such a configuration.

The packet management unit 90 is electrically connected to the node controller 94. The node controller 94 receives a packet from the connection unit 32 or any other node module 54 through the packet management unit 90 or transmits a packet to the connection unit 32 or any other node module 54 through the packet management unit 90. The node controller 94 performs a process corresponding to the content of a request included in the packet received from the packet management unit 90. For example, in a case where the content of a request included in the packet is an access request (a read request or a write request), the node controller 94 accesses the nonvolatile semiconductor memory 96. In a case where an access request is received, the node controller 94 temporarily stores the received access request in the work memory 98.

As the nonvolatile semiconductor memory 96, for example, a NAND flash memory, a bit cost scalable memory (BiCS), a magnetoresistive memory (MRAM), a phase change memory (PcRAM), a resistance change memory (RRAM (registered trademark)), or a combination thereof may be used. The nonvolatile semiconductor memory 96 may include a flash memory product that is referred to as an embedded multimedia card (eMMC®). The eMMC accommodates a NAND flash memory and a control circuit in one BGA package and is connected to an external device through an interface of MMC that is a standard of a memory card. The nonvolatile semiconductor memory 96 performs a background process such as garbage collection, wear levelling, flush cache (cache writing), or read refresh (read retention) at an idle time or immediately after a write operation, or the like.

The work memory 98 is not a nonvolatile semiconductor memory but is a memory that temporarily stores data. As the work memory 98, various RAMs such as a dynamic random access memory (DRAM) and the like can be used. In a case where the nonvolatile semiconductor memory 96 provides the function of the work area, the work memory 98 may not be arranged in the node module 54.

[Data Structure of Packet]

Figure 7:
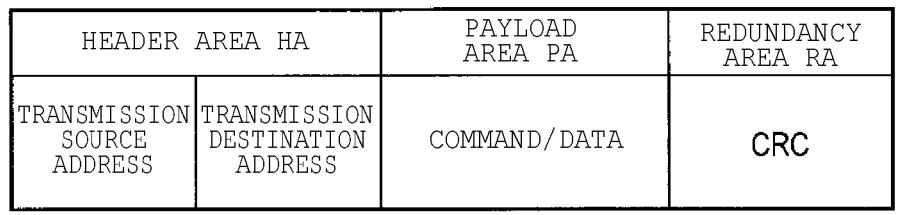
FIG. 7 illustrates a data structure of a packet used in the first embodiment.

FIG. 7 illustrates an example of a packet of data and information transmitted in the storage system 16 according to the present embodiment. The packet includes a header area HA, a payload area PA, and a redundant area RA, but is not limited to such a configuration.

In the header area HA, for example, a command, addresses (from_x, from_y) of X direction and Y direction of a node module that is a transmission source, addresses (to_x, to_y) of X direction and Y direction of a node module that is a transmission destination, and the like are described. In the payload area PA, for example, data or the like is described. In addition, the command may be described also in the payload area PA. The data size of the payload area PA is variable. In the redundant area RA, for example, a cyclic redundancy check (CRC) code or the like described. The CRC code is a code (information) used for detecting an error in the data of the payload area PA.

The routing circuit 52 that has received the packet having the configuration described above determines a routing destination based on a predetermined transmission algorithm. Based on the transmission algorithm, the packet is transmitted among the routing circuits 52 and arrives at a node module 54 of the node address of the final destination.

For example, the routing circuit 52, based on the transmission algorithm described above, determines a node module 54 located on a route for which the number of times of transmissions from the node module 54 connected to the routing circuit 52 to the node module 54 of the destination is minimum as the node module 54 of the transmission destination. In addition, the routing circuit 52, based on the transmission algorithm described above, in a case where there area plurality of routes for which the number of times of transmissions from the node module 54 connected to the routing circuit 52 to the node module 54 of the destination is minimum, selects one route from among the plurality of routes using an arbitrary method. Similarly, in a case where the node module 54 located on the route for which the number of times of transmissions is minimum among a plurality of node modules 54 connected to the node module 54 connected to the routing circuit 52 fails or in a busy state, the routing circuit 52 determines the other node module 54 as the transmission destination.

There are cases where a plurality of node modules 54 is logically connected in a mesh-shaped network, whereby there are a plurality of routes for which the number of times of transmissions of a packet is minimum. In such a case, even in a case where a plurality of packets having a specific node module 54 as the destination are output, the plurality of output packets are transmitted to be distributed in a plurality of routes based on the transmission algorithm described above. For this reason, the concentration of accesses on the specific node module 54 can be avoided, and a decreased in the throughput of the entire storage system 16 can be prevented.

[Packet Transmitting Operation]

Figure 8:
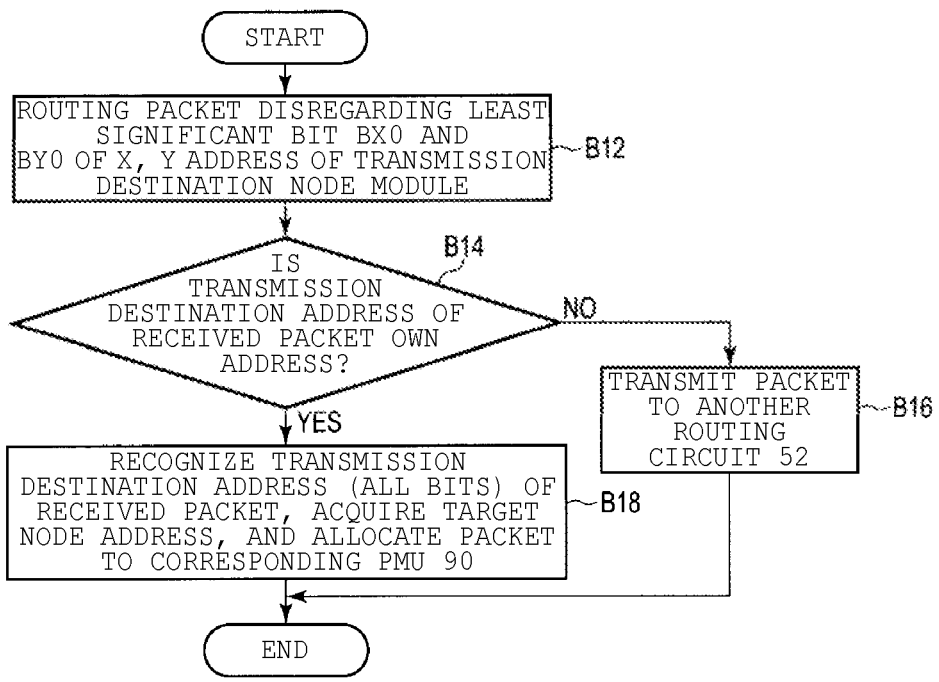
FIG. 8 is a flowchart of a process of packet transmission according to the first embodiment.

FIG. 8 is a flowchart that illustrates a packet transmitting operation carried out by the routing circuit 52.

In Step B12, when a packet is received from the connection unit 32 or the other routing circuit 52, the routing circuit 52 analyzes addresses (to_x, to_y) of X direction and Y direction of the transmission destination node module described in the header area HA of the packet. At this time, the routing circuit 52 performs routing disregarding (by masking) least significant bits of the addresses (to_x, to_y).

Figure 9:
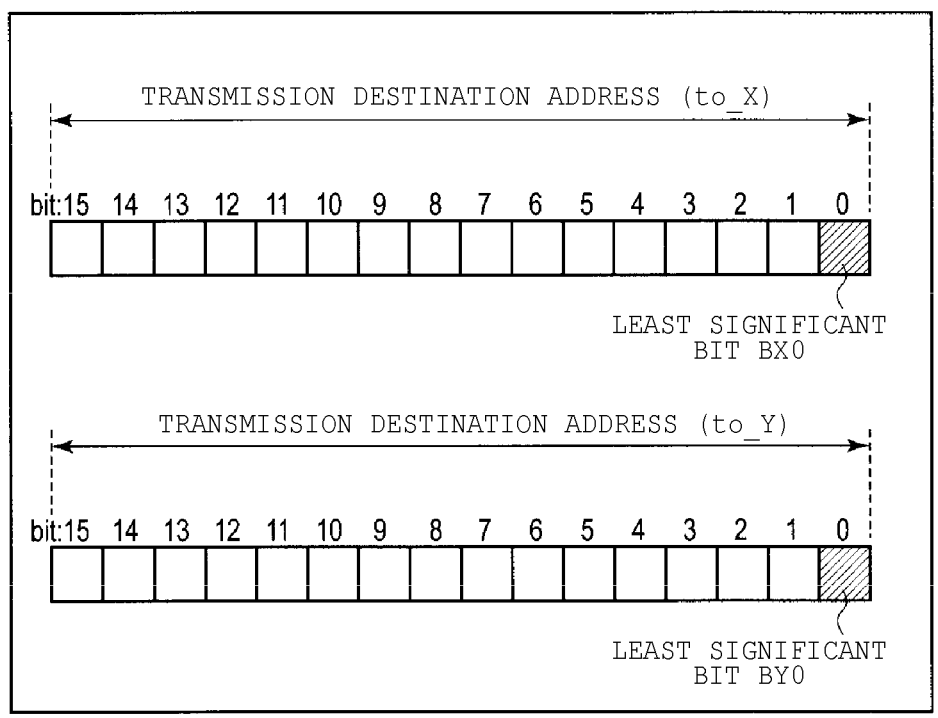
FIG. 9 illustrates a structure of a transmission destination address according to the first embodiment.

For example, as illustrated in FIG. 9, in a case where each of the addresses (to_x, to_y) are described using 16 bits, in Step B12, the routing circuit 52 performs routing of the packet disregarding the least significant bits BX0 and BY0, which are denoted by diagonal lines, of the addresses (to_x, to_y). In other words, the routing circuit 52 performs routing of the packet regardless of the least significant bits BX0 and BY0 of the addresses (to_x, to_y). In addition, an FPGA address is described using the data structure illustrated in FIG. 9.

More specifically, as illustrated in FIG. 4, in a case where four FPGA addresses are represented by (000, 000), (010, 000), (000, 010), and (010, 010) in binary denotations, the routing circuit 52 performs routing of a packet disregarding the least significant bits of the four FPGA addresses. In other words, the routing circuit 52 performs routing of the packet based on the FPGA addresses represented by (00X, 00Y), (01X, 00Y), (00X, 01Y), and (01X, 01Y) disregarding the least significant bits of the four FPGA addresses. Here, in the address denotation described above, bit states (state "0" or state "1") of X and Y are arbitrary.

Subsequently, the routing circuit 52, in Step B14, determines whether or not the FPGA address that is acquired by acquiring an FPGA address from the transmission destination node address described in the received packet is its own address. The address of the routing circuit 52 is the same as the address of an FPGA 82 in which the routing circuit 52 is included. At this time, the routing circuit 52, as described in Step B12, determines whether or not the address is its own address in a state in which the least significant bits BX0 and BY0 of the transmission destination FPGA addresses is disregarded.

In a case where the transmission destination FPGA address of the received packet is not its own address (No in Step B14), in Step B16, the routing circuit 52 transmits the packet to another routing circuit 52 in the route for which the number of times of transmissions is minimum and ends this operation.

On the other hand, in a case where the transmission destination FPGA address of the received packet is its own address (Yes in Step B14), in Step B18, the routing circuit 52 analyzes all bits of the transmission destination FPGA addresses and allocates the packet to a node address of the recognized transmission destination addresses. In other words, in Step B18, the routing circuit 52 does not disregard the least significant bits BX0 and BY0 of the transmission destination node module address and relatively allocates the packet to a node address of the recognized transmission destination. More specifically, the routing circuit 52 transmits the packet to the packet management unit 90 to which a node module corresponding to a target node address is connected. The packet management unit 90 to which the packet has been transmitted allocates the packet to the node module 54 of the target node address and ends this operation.

[Operation According to First Embodiment]

Figure 10:
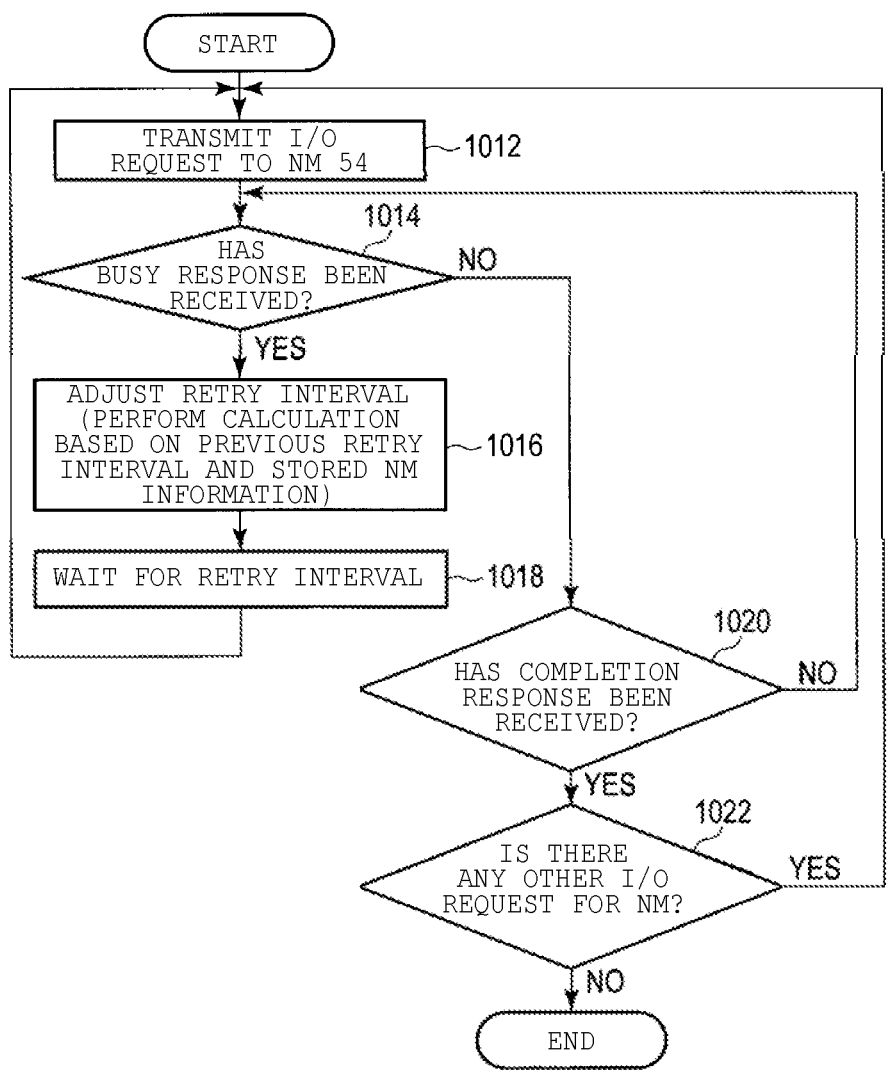
FIG. 10 is a flowchart of a process performed by the connection unit relating to an I/O request according to the first embodiment.
Figure 11:
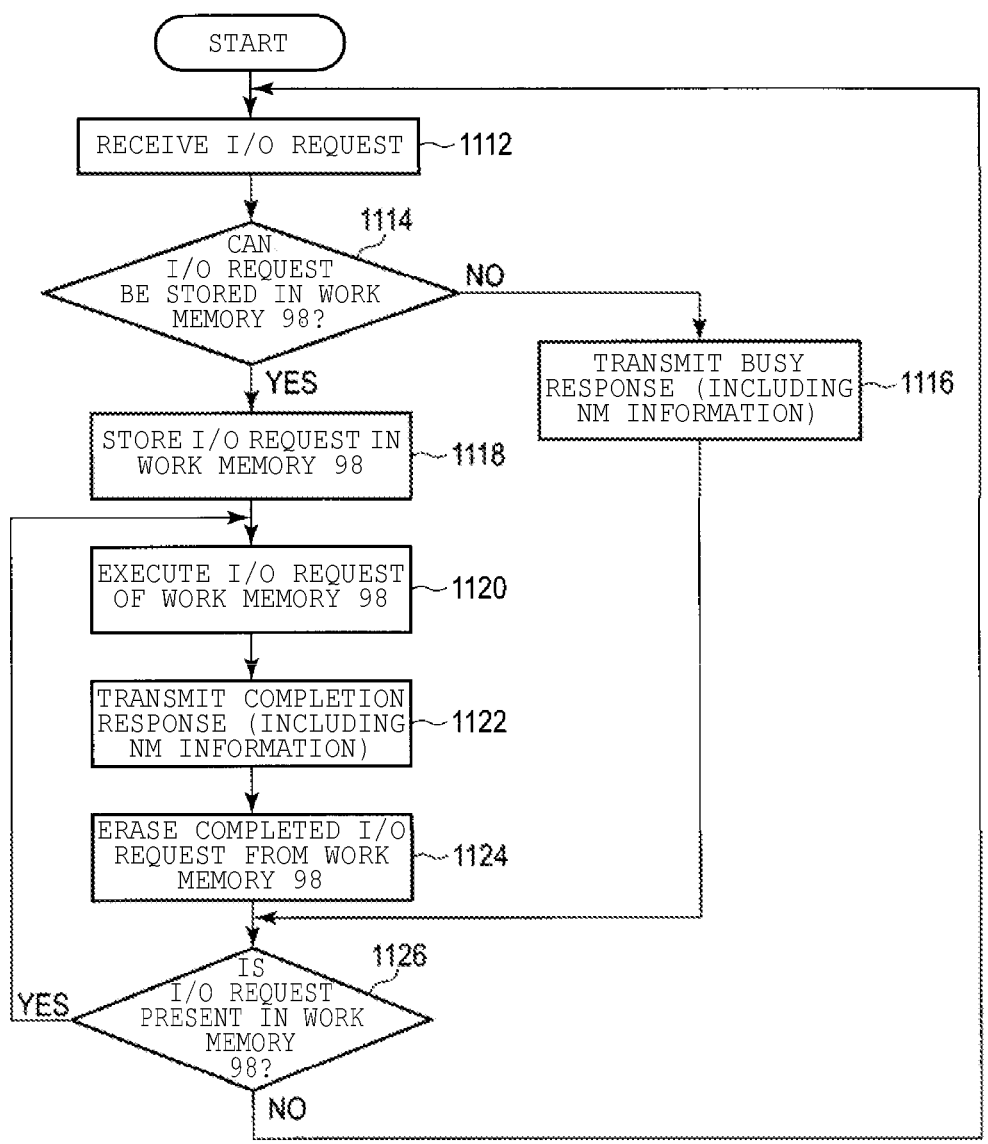
FIG. 11 is a flowchart f a process performed by the node module relating to an I/O request according to the first embodiment.

FIG. 10 is a flowchart that illustrates an example of the operation carried out by the connection unit 32. FIG. 11 is a flowchart of the operation by the node module 54. An example of the operation according to the first embodiment will be described with reference to FIGS. 10 and 11.

The connection unit 32 that has received an I/O command directing to access the storage unit 30 from the client 10 transmits an I/O request (a write request or a read request) addressed to a node module 54 that is an access target in Block 1012 in FIG. 10. The I/O request arrives at the target node module 54 through the routing circuit 52 based on the transmission algorithm described above. The node module 54 that is the access target receives the I/O request in Block 1112 in FIG. 11 and determines whether or not the I/O request can be stored in the work memory 98, in other words, whether or not the work memory 98 has a capacity for storing the I/O request in Block 1114.

In a case where the I/O request cannot be stored in the work memory 98, the node module 54 replies a busy response in Block 1116. The busy response represents that there is no free space for storing the I/O request in the work memory 98 or the nonvolatile memory 96 and the I/O request cannot be accepted and has a data structure that has a configuration illustrated in FIG. 7. The busy response includes NM information. The NM information represents a node module state such as a processing time of I/O data, a time taken for an I/O request to arrive at the node module, the number and the type of requests stored in the work memory 98, and a processing time and a delay time of the nonvolatile semiconductor memory 96. While the NM information is frequently described in the payload, the NM information may be described in the header.

In a case where the I/O request can be stored in the work memory 98, the node module 54, in Block 1118, stores the received I/O request in the work memory 98. Then, in Block 1120, the node module 54 reads one I/O request (for example, a request that has been stored for a longest time) from the work memory 98 and executes the read I/O request. When the execution of the I/O request is completed, the node module 54 replies a completion response in Block 1122. The completion response reports the completion of the execution of the I/O request, includes the NM information, and has a data structure having the configuration illustrated in FIG. 7. The node module 54, in Block 1124, removes the I/O request of which execution has been completed from the work memory 98 or sets the I/O request not to be referred.

After Block 1116 or Block 1124, the node module 54, in Block 1126, determines whether or not an I/O request remains in the work memory 98. In a case where an I/O request remains in the work memory 98, the node module 54 executes a next I/O request in the process from Block 1120. On the other hand, in a case where no I/O request remains in the work memory 98, the node module 54, in Block 1112, waits for reception of a next I/O request.

As illustrated in FIG. 10, after transmitting an I/O request to the node module 54 in Block 1012, the connection unit 32 determines whether or not a busy response has been received in Block 1014. In a case where the busy response has been received, the connection unit 32 adjusts a retry interval in Block 1016. More specifically, the connection unit 32 calculates an interval until an I/O request is re-transmitted next based on the retry interval that is currently set and the received NM information. For example, the retry interval is calculated as below.

$$\text{Retry interval} = ((\text{driver PMU time}) \times \alpha\_pmutime) \gg \beta\_pmutime + ((\text{process\_time}) \times \alpha\_temmc) \gg \beta\_temmc + (\text{number of retries}) \times \alpha\_retry + \gamma\_delay \quad \text{Equation (1)}$$

Each variable represented in Equation (1) is included in the NM information. The driver PMU time is a time until a response packet is returned after an issuance packet is issued from a driver and is a sum value of a packet routing time from the connection unit 32 to the node module 54, a command processing time of the node module 54, and a packet routing time from the node module 54 to the connection unit 32.

The "process_time" is a command processing time of the node module 54.

The retry number is a value that represents the order of the retry.

The $\alpha$ and $\beta$ are weighting factors for the retry interval.

Bit shifts in $\beta$ are for a rounding process. For example, a process of 1.000=>1, 1.001=>1, 1.500=>1, 1.999=>1, 2.000=>2, 2.999=>3, 3.000=>3 is performed.

The connection unit 32 waits for the calculated retry interval in Block 1018, and thereafter re-transmits (retry) the I/O request to the node module 54 that is the access target in Block 1012.

In a case where a busy response has not been received in Block 1014, the connection unit 32 determines whether or not a completion response has been received in Block 1020. In a case where the completion response has not been received, in Block 1014, the connection unit 32 determines whether or not a busy response has been received again. In other words, after the transmission of the I/O request, the connection unit 32 waits for reception of a busy response or a completion response.

In a case where the completion response has been received, the connection unit 32 determines whether or not another I/O request for the node module 54 that is the access target is stored in the queue of the memory 74 in Block 1022. In a case where another I/O request is stored in the queue, the connection unit 32 transmits another I/O request to the node module 54 in Block 1012. On the other hand, in a case where another I/O request is not stored in the queue, the process ends.

Figure 12:
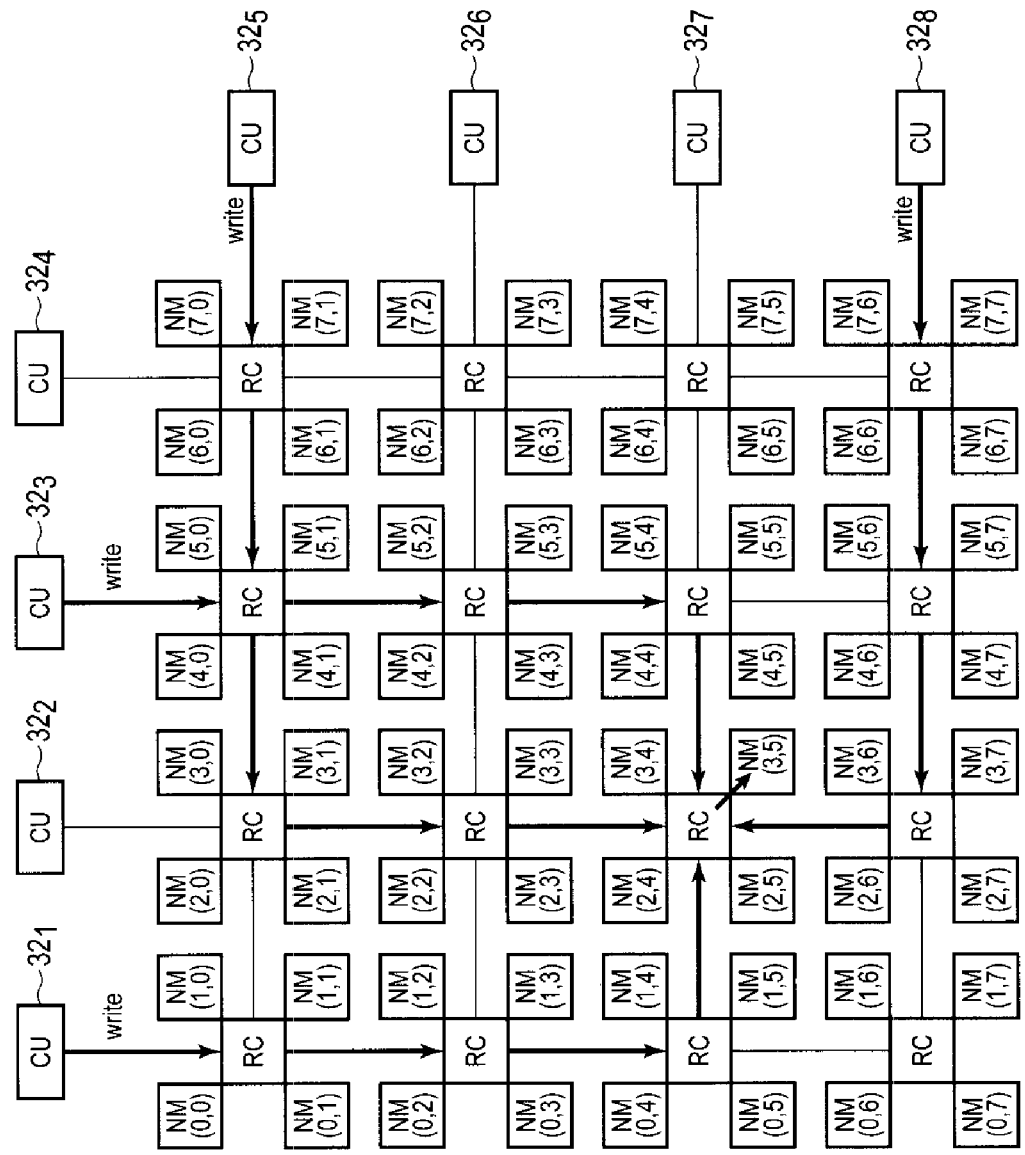
FIG. 12 illustrates an example of a state of the storage unit according to the first embodiment.

FIG. 12 illustrates a status in which I/O requests (for example, write requests) from four connection units $32_1$, $32_3$, $32_5$, and $32_8$ are concentrated on one node module NM (3, 5) (see Block 1012 illustrated in FIG. 10). In addition, there are cases where write requests from the four connection units $32_1$, $32_3$, $32_5$, and $32_8$ are transmitted not simultaneously but with time differences.

Figure 13:
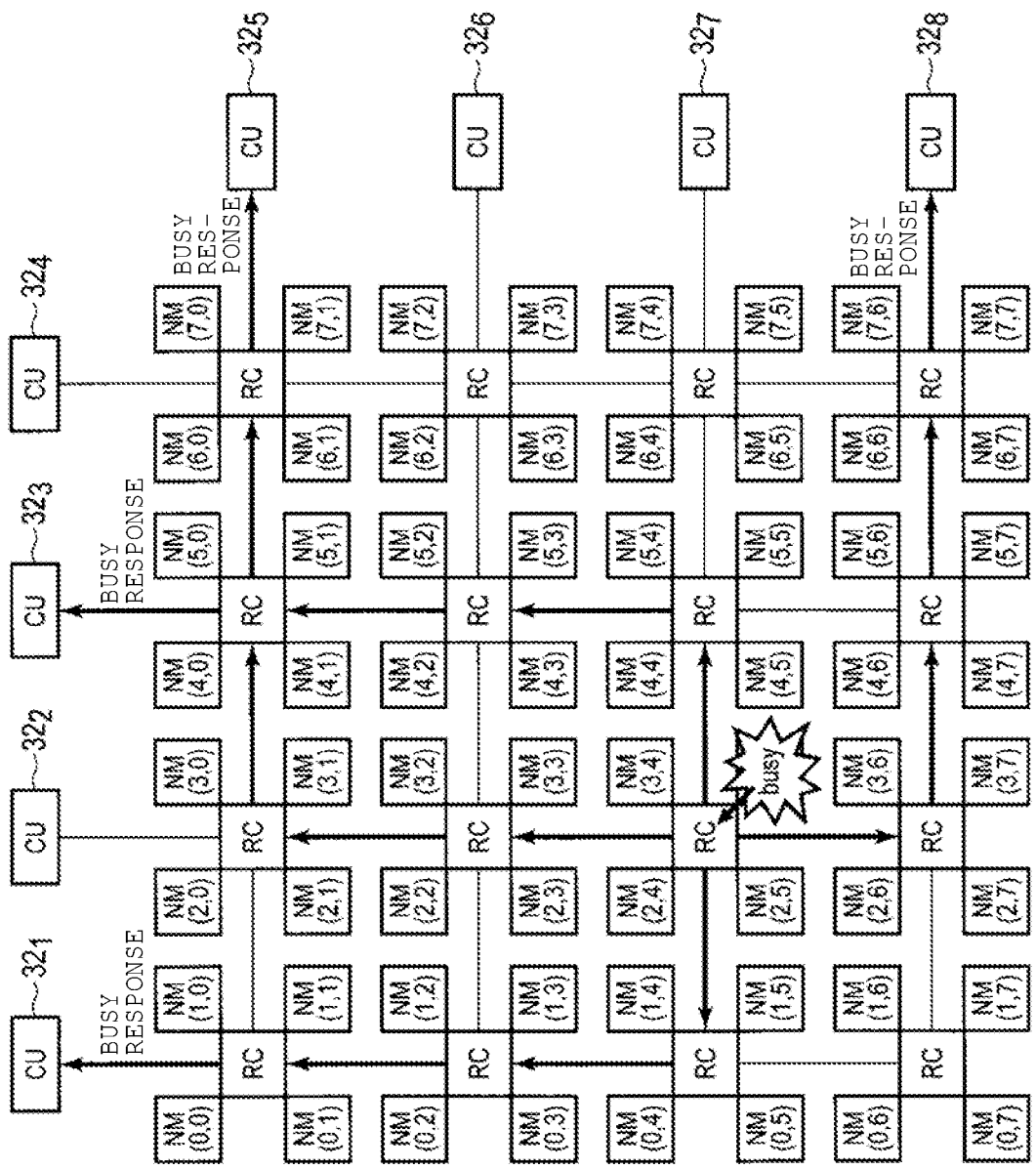
FIGS. 13 through 16 each illustrate another state of the storage unit according to the first embodiment.

FIG. 13 illustrates a status in which a node module NM (3, 5) replies busy responses to four connection units $32_1$, $32_3$, $32_5$, and $32_8$ (see Block 1116 illustrated in FIG. 11). There are cases where the four busy responses are transmitted not simultaneously but with time differences.

Figure 14:
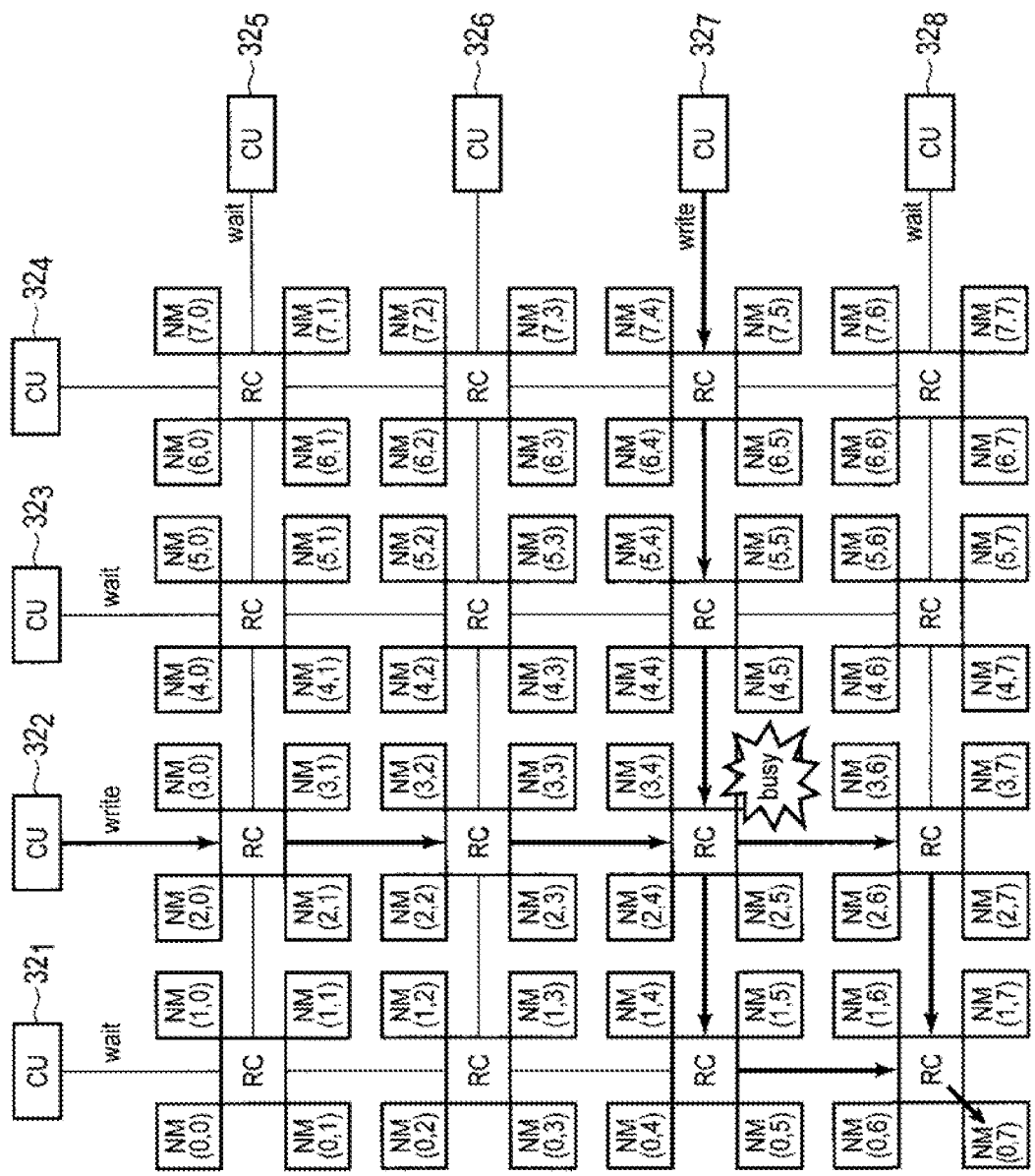

Thereafter, the connection units $32_1$, $32_3$, $32_5$, and $32_8$, as illustrated in FIG. 14, turn into a waiting state (see Block 1018 illustrated in FIG. 10). In addition, there are cases where the four connection units $32_1$, $32_3$, $32_5$, and $32_8$ turn into the waiting state not simultaneously but with time differences. While there is a case where, during the waiting state of the connection units $32_1$, $32_3$, $32_5$, and $32_8$, other connection units, for example, the connection units $32_2$ and $32_7$ transmit write requests to another node module, for example, to NM (0, 7), at that time, the communication route of the network is not occupied by a retry packet. For that reason, the write requests from the connection units $32_2$ and $32_7$ for NM (0, 7) is detoured, or there is no request not arriving at NM(0, 7), and NM(0, 7) receives the write requests.

Figure 15:
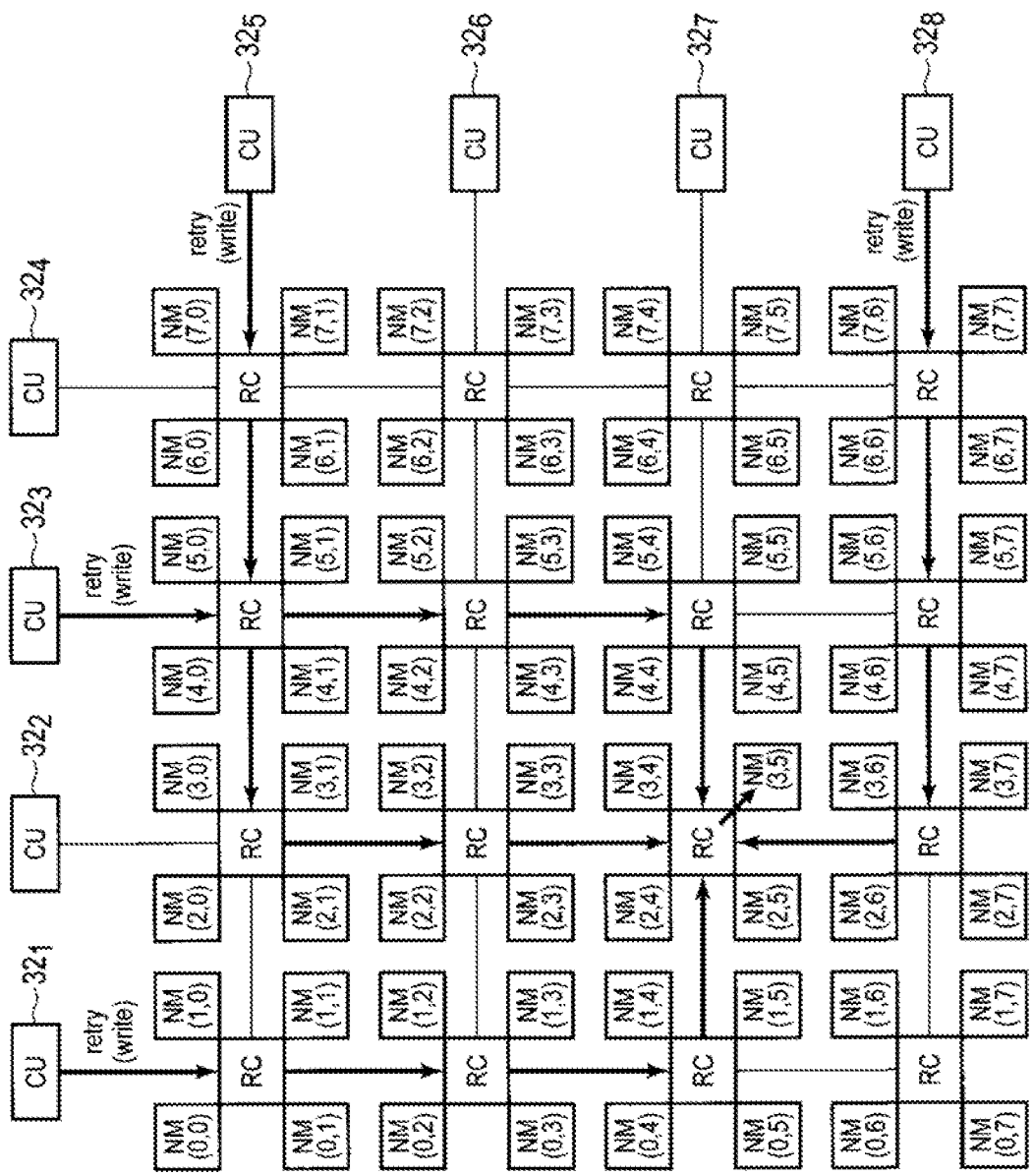
Figure 16:
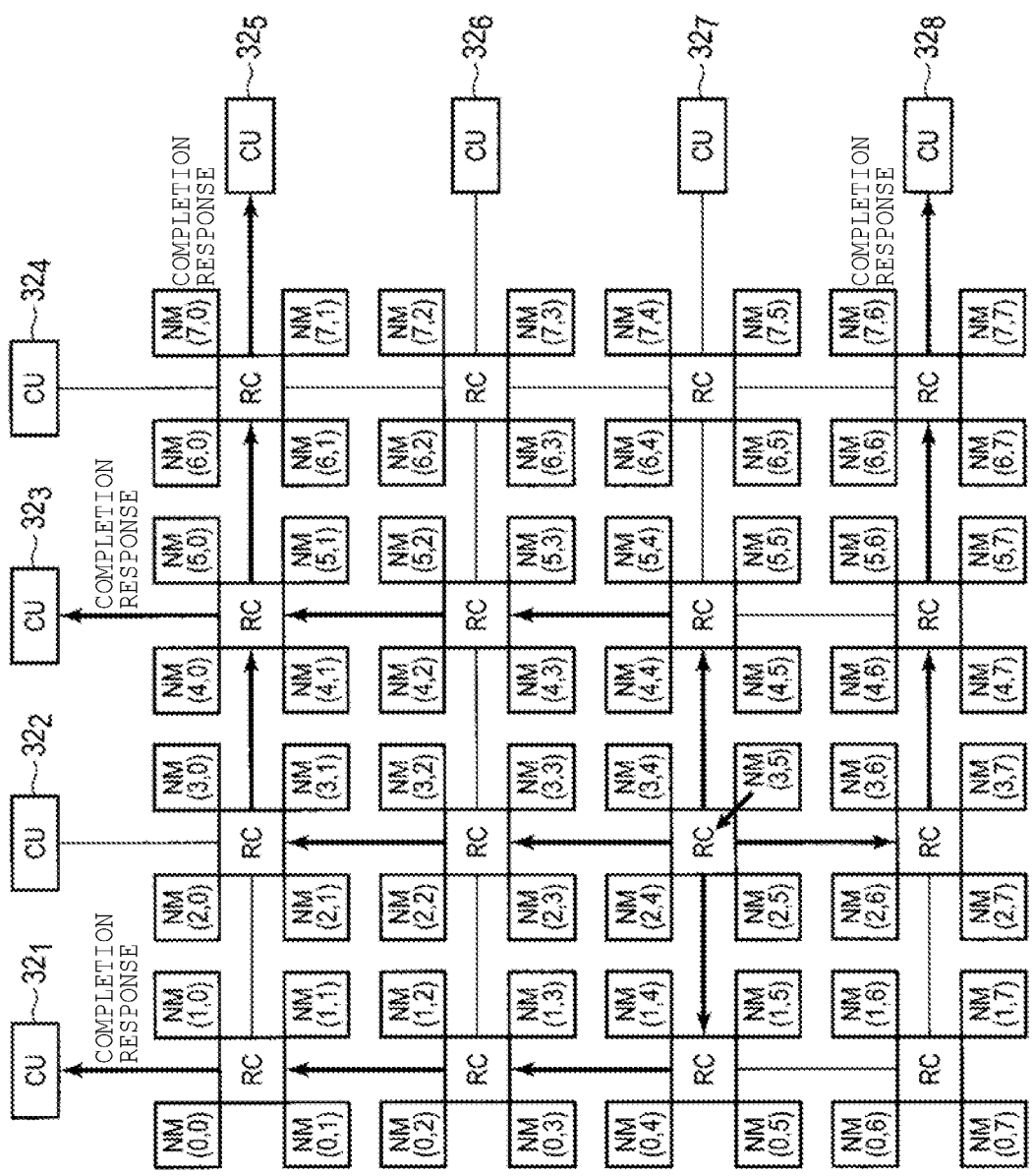

FIG. 15 illustrates a status in which the connection units $32_1$, $32_3$, $32_5$, and $32_8$ re-transmit write requests after waiting for the retry interval. The write requests do not need to be simultaneously transmitted but may be re-transmitted with time differences. At the time of re-transmission, the free space of the nonvolatile semiconductor memory 96 or the work memory 98 of NM(3, 5) increases, and the write requests can be stored. For that reason, the write requests are executed. When the execution is completed, as illustrated in FIG. 16, completion responses are sent back from NM(3, 5) to the connection units $32_1$, $32_3$, $32_5$, and $32_8$.

Figure 17:
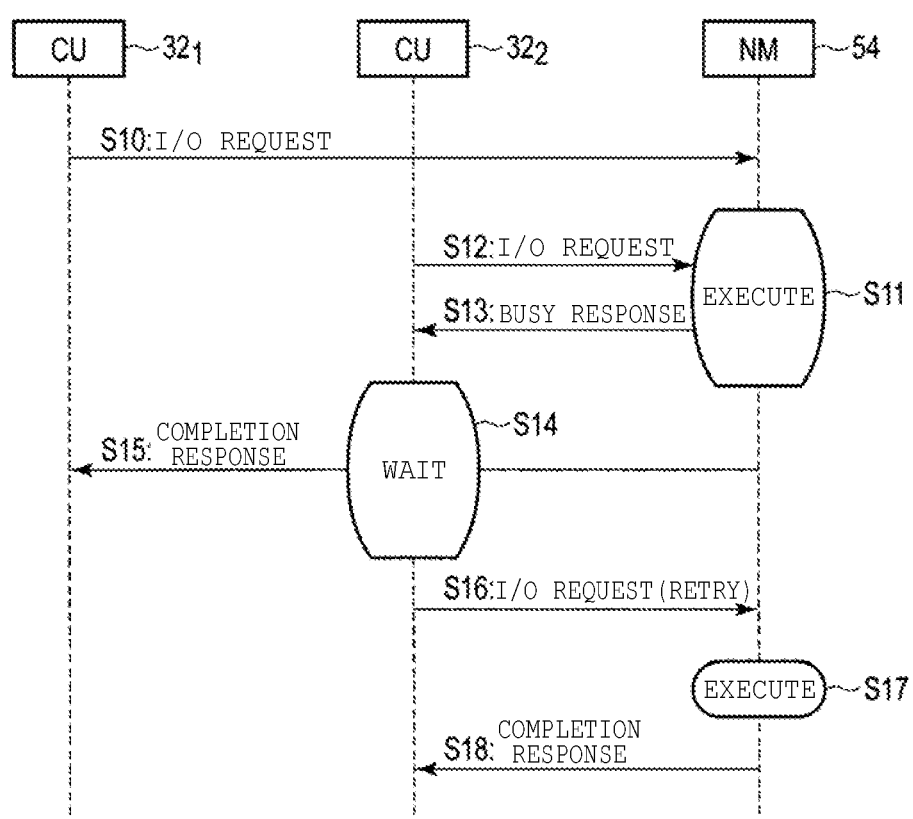
FIG. 17 is a sequence diagram of operations relating to an I/O request according to the first embodiment.

FIG. 17 is a sequence diagram that exemplifies the operations described above as operations between connection units $32_1$ and $32_2$ representing a plurality of connection units 32 and the node module 54.

When an I/O command (a write command or a read command) is received from the client 10, the connection unit $32_1$ transmits an I/O request to the node module 54 that is an access target (S10), and the node module 54 executes the I/O request (S11). During the execution, in a case where the connection unit $32_2$ transmits another I/O request to the node module 54 (S12), the work memory 98 of the node module 54 is assumed not to be able to store the I/O request. The node module 54 sends back a busy response to the connection unit $32_2$ (S13). The connection unit $32_2$ is in the waiting state and holds the transmission of a retry packet (S14).

When the execution (S11) of the request performed by the node module 54 is completed, the node module 54 sends back a completion response to the connection unit $32_1$ (S15). The waiting state of the connection unit $32_2$ is set to be continued after the completion of the execution of the request from the connection unit $32_1$ that is performed by the node module 54.

For this reason, when the waiting state ends and the connection unit $32_2$ re-transmits the I/O request (S16), the node module 54 has completed the execution of the I/O request from the connection unit $32_1$. For this reason, the node module 54 executes the I/O request that is re-transmitted (retry) from the connection unit $32_2$ (S17). When the execution (S17) of the request that is performed by the node module 54 is completed, the node module 54 sends back a completion response to the connection unit $32_2$ (S18).

As described above, according to the first embodiment, the node module 54 stores several requests from the connection unit 32 in the work memory 98 and executes the requests. For this reason, when a plurality of requests is concentrated on one node module and more requests cannot be accepted, the node module replies a busy response to the connection unit. In a case where the busy response is received, the connection unit waits for a retry interval based on the NM information representing the status of the node module, and then re-transmits the request instead of immediately re-transmitting the request. In this way, since the transmission interval of the retry packet is adjusted, the number of useless retry packets transmitted to the node module that is in the busy state decreases, and the quantity of packets inside the network decreases. As a result, packets toward node modules that are not in the busy state are transmitted with priority. In addition, at the time of re-transmitting (re-trying) the request, a possibility that the node module 54 cannot execute the request decreases. During the waiting state, since the communication route of the network is not occupied by retry packets, the operation speed of the storage system is not decreased, and the requests from the other connection units are detoured, or there is no request not arriving at the node module that is the destination.

Since the NM information used for determining the retry interval is included in the response from the node module 54, the NM information can be fed back to the connection unit in real time, and a polling packet for an inquiry does not need to be transmitted, and the resources of the network are not uselessly consumed. Since each connection unit independently adjusts the load, blocking according to the exchange of information used for adjusting the retry interval does not occur between the connection units. In addition, a device dedicated for load balancing used for adjusting the load of the node module does not need to be introduced.

Second Embodiment

According to the first embodiment, when a command is received from a client, the connection unit 32 transmits a request to the node module 54 regardless of the state of the node module 54. Different from this, according to a second embodiment, before transmission of a request to the node module 54, the state of the node module 54 is checked.

Figure 18:
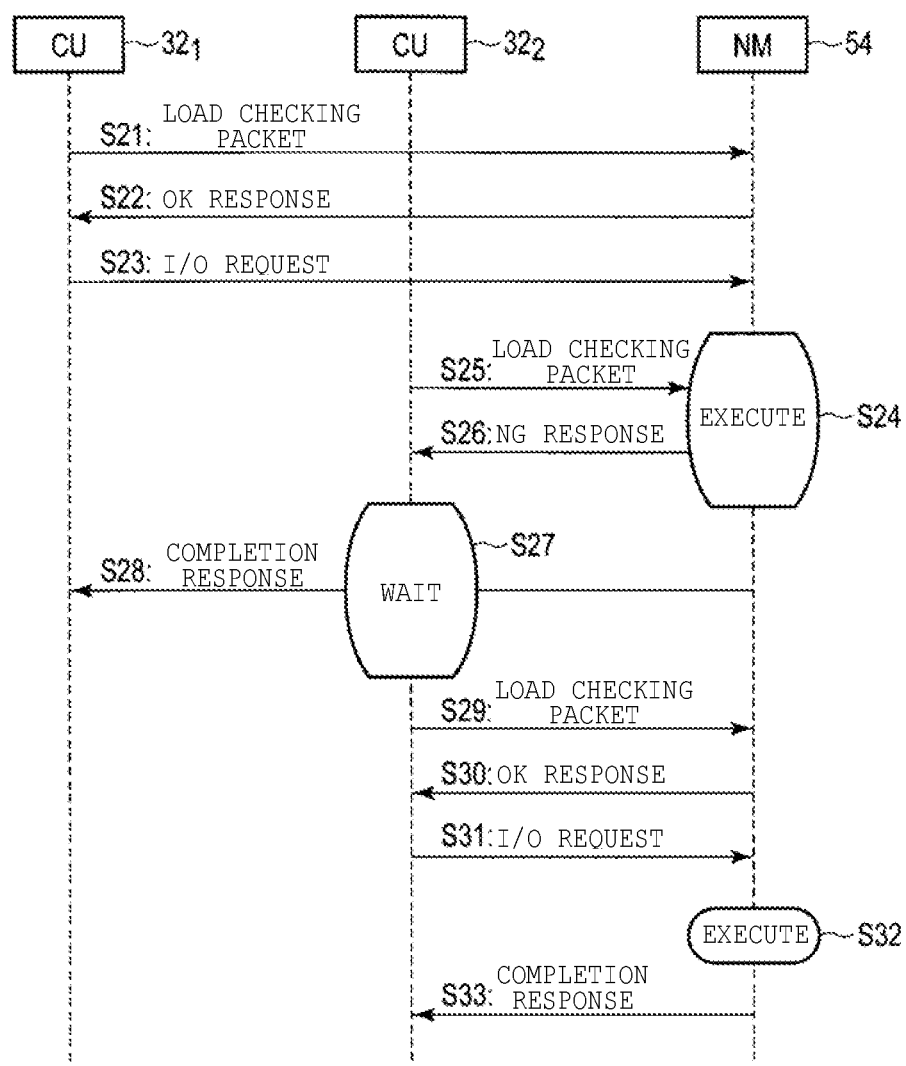
FIG. 18 is a sequence diagram of operations relating to an I/O request according to a second embodiment.

Since the system configuration of the second embodiment is the same as that of the first embodiment, description thereof will not be presented. FIG. 18 is a sequence diagram of operations carried out by connection units $32_1$ and $32_2$ and a node module 54 relating to an I/O request according to the second embodiment. FIG. 18 illustrates the operations of the connection units $32_1$ and $32_2$ representing a plurality of connection units 32.

When an I/O command (a write command or a read command) is received from a client 10, the connection unit $32_1$ transmits a load check packet to a node module 54 that is an access target (S21). When the load check packet is received, the node module 54 determines whether or not the number of I/O requests stored in the work memory 98 is less than a reference value. At this time, the number of I/O requests stored in the work memory 98 is assumed to be less than the reference value. In a case where the number of requests stored in the work memory 98 is less than the reference value, the node module 54 determines that the load of the node module 54 is less than a reference value, generates a response packet representing an indication (OK) allowing the transmission of an I/O request, and transmits the generated response packet to the connection unit $32_1$ (S22).

In a case where a response packet representing the indication (OK) allowing the transmission of an I/O request is received from the node module 54, the connection unit $32_1$ generates an I/O request used for directing the node module 54 to write or read data and transmits the generated I/O request to the node module 54 through the network between the node modules (S23). The node module 54 stores the I/O request received from the connection unit $32_1$ in the work memory 98 functioning as a temporary memory and, based on the I/O request stored in the work memory 98, accesses the nonvolatile semiconductor memory 96 and executes the I/O request (S24).

On the other hand, in a case where an I/O command of data is received from a client 200, the connection unit $32_2$ transmits the load check packet to a node module 54 that is an access target (S25). When the load check packet is received from the connection unit $32_2$, the node module 54 determines whether or not the number of I/O requests stored in the work memory 98 is less than the reference value. At this time, the number of I/O requests stored in the work memory 98 is assumed not to be less than the reference value. In a case where the number of I/O requests stored in the work memory 98 is not less than the reference value, the node module 54 generates a response packet representing an indication (NG) not allowing the transmission of an I/O request and transmits the generated response packet P2 to the connection unit $32_2$ (S26).

The response packet representing the indication OK or NG, similar to the busy response and the completion response illustrated in FIG. 1, includes the NM information that represents the status of the node module.

When the response packet representing the indication (NG) not allowing the transmission of an I/O request is received from the node module 54, the connection unit $32_2$ turns into the waiting state (S27) and neither can transmit an I/O request to the node module 54 nor can transmit the load check packet. The waiting time of the connection unit $32_2$, as described in Block 1016 according to the first embodiment illustrated in FIG. 10, is calculated based on the waiting time that is currently set and the NM information included in the NG response. For this reason, the waiting state of the connection unit $32_2$ continues after the completion of the execution of the I/O request from the connection unit $32_1$ that is performed by the node module 54.

When the execution of the I/O request received from the connection unit $32_1$ is completed, the node module 54 transmits a completion response to the connection unit $32_1$ (S28). The node module 54 erases the completed I/O request from the work memory 98 or sets the completed I/O request not to be referred.

When the waiting state is released, the connection unit $32_2$ re-transmits the load check packet to the node module 54 that is the access target (S29). When the load check packet is received from the connection unit $32_2$, the node module 54 determines whether or not the number of I/O requests stored in the work memory 98 is less than the reference value (the load of the node module 54 is less than the reference value). At this time, since the process is not executed, the node module 54 determines that the number of I/O requests stored in the work memory 98 is less than the reference value. In a case where the number of I/O requests stored in the work memory 98 is less than the reference value, the node module 54 generates a response packet representing the indication (OK) allowing the transmission of an I/O request and transmits the generated response packet to the connection unit $32_2$ (S30).

In a case where a response packet representing the indication (OK) allowing the transmission of an I/O request is received from the node module 54, the connection unit $32_2$ generates an I/O request used for directing the node module 54 to write or read data. Thereafter, the connection unit $32_2$ transmits the generated I/O request to the node module 54 through the network between the node modules (S31). The node module 54 stores the I/O request received from the connection unit $32_2$ in the work memory 98 functioning as a temporary memory. Then, the node module 54, based on the I/O request stored in the work memory 98, accesses the nonvolatile semiconductor memory 96 and executes the I/O request (S32).

When the execution of the I/O request received from the connection unit $32_2$ is completed, the node module 54 transmits a completion response to the connection unit $32_2$ (S33). Then, the node module 54 erases the completed I/O request from the work memory 98 or sets the completed I/O request not to be referred.

The load check packet and the response packet also have the data structure illustrated in FIG. 7. In the load check packet, data representing the load check packet are described in the payload area PA. In the response packet, data representing the response packet and data representing allowing/no-allowing the transmission of an I/O request are described in the payload area PA. The data size of each of the load check packet and the response packet is less than the data size of the I/O request. In order to secure an area for storing the load check packet and the response packet in the storage area of the work memory 98, each node module 54 limits the number of I/O requests stored in the storage area of the work memory 98. As a result, also in a case where congestion occurs in the network between the node modules, each node module 54 can transmit the load check packet and the response packet having a small data size without any delay.

According to the second embodiment, before the transmission of a request to the node module 54, the load check packet for checking the state of the node module 54 is transmitted, and the request is transmitted to the node module 54 only in a case where the load of the node module 54 is low. As a result, a request packet that cannot be executed is not transmitted, and a decrease in the performance of the storage system can be prevented. In addition, since the load check packet is not transmitted in a case where the load of the node module 54 is high, the network is less likely to become busy due to repetition of re-transmission of the load check packet having a small data size.

Third Embodiment

In the first and second embodiments, the retry interval is calculated based on the retry interval that is currently set and the NM information. At the time of performing retry after the calculated retry interval, the busy state of the node module is released. However, in a case where there is a variation in the access speed of the nonvolatile semiconductor memory 96, the busy state of the node module may not be released at the time of performing retry. Considering this issue, according to a third embodiment, NM information also includes an item representing success/failure of each retry. As in Q-learning, information of success/failure of the retry may be given as a reward. A connection unit 32 stores the NM information for each node module, performs a statistical process, and determines an optimal retry interval for each node module through learning.

Figure 19:
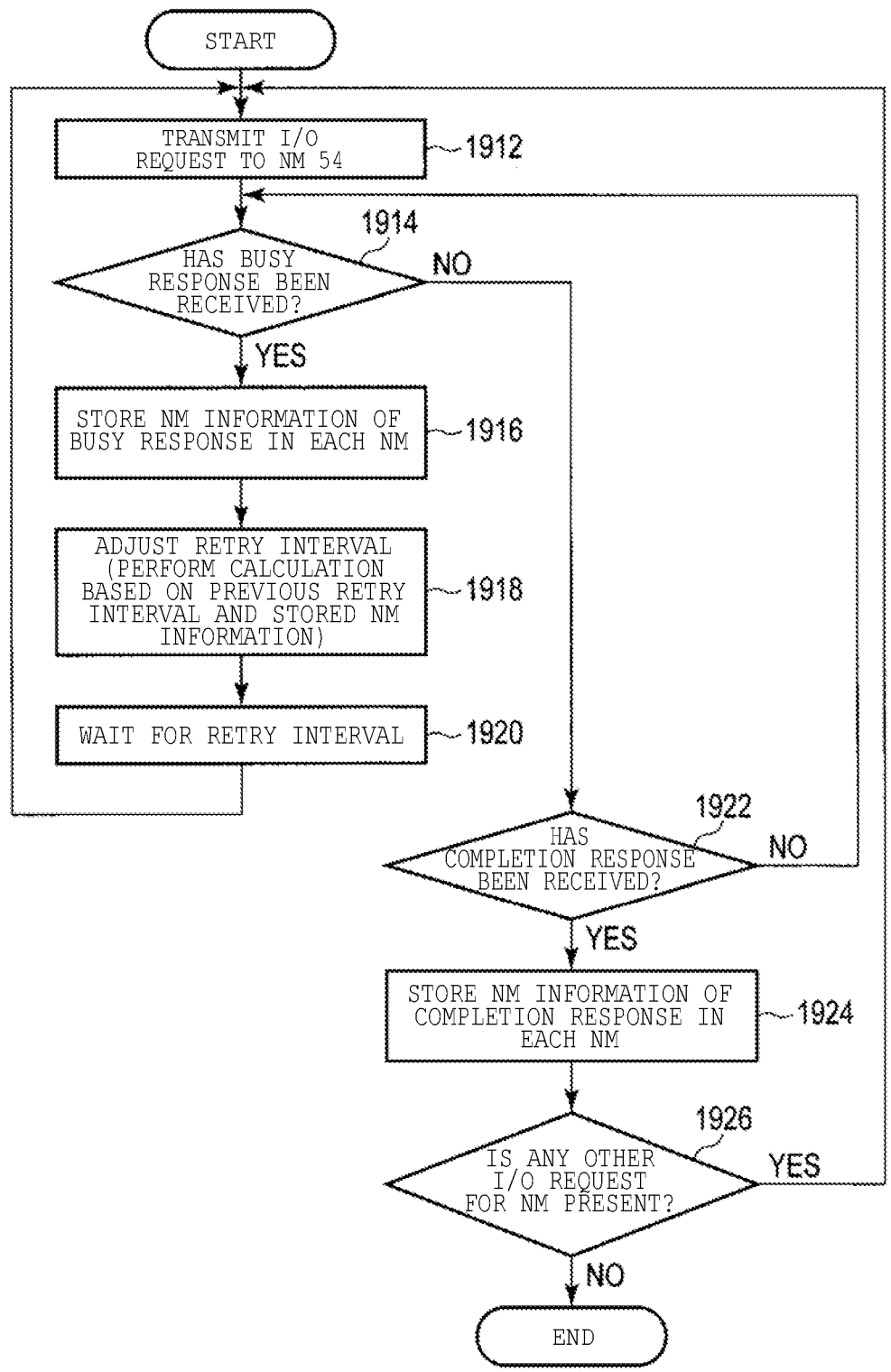
FIG. 19 is a flowchart of a process performed by a connection unit relating to an I/O request according to a third embodiment.

FIG. 19 is a flowchart of the operation of the connection unit 32. Since an example of the operation of the node module 54 is the same as that represented in the flowchart illustrated in FIG. 11, the flowchart thereof will not be illustrated.

The connection unit 32 that has received a command directing to access the storage unit 30 from a client 10 transmits an I/O request (a write request or a read request) to a node module 54 that is an access target in Block 1912. The node module 54, as illustrated in FIG. 11, determines whether or not the I/O request can be stored in the work memory 98, and in a case where the I/O request cannot be stored, replies a busy response, and in a case where the I/O request can be stored in the work memory 98, executes the I/O request and replies a completion response. Since the busy response and the completion response represent success/failure of the retry, an item representing the success/failure of the retry does not need to be included in the NM information. However, NM information including an item representing success/failure of retry in addition to the items according to the first embodiment may be included. In addition, a busy response may be replied to the transmission of a retry packet.

The connection unit 32 determines whether or not a busy response is received in Block 1914. In a case where a busy response also including success/failure of the retry has been received, the connection unit 32 stores the NM information for each node module in the memory 74 in Block 1916. The connection unit 32 adjusts the retry interval in Block 1918. More specifically, an interval until an I/O request is re-transmitted next is calculated based on the retry interval that is currently set and the stored NM information.

The retry interval is calculated in consideration of success/failure at the time of performing previous retry based on Equation (1) used in the first embodiment. Thus, the retry interval is decreased in the case of success of retry, and the retry interval is increased in the case of failure of retry.

$$\text{retry interval}(t+1) = ((\text{driver PMU time}) \times \alpha\_\text{pmutime}) \gg \beta\_\text{pmutime} + ((\text{process\_time}) \times \alpha\_\text{temmc}) \gg \beta\_\text{temmc} + (\text{number of times of retry}) \times \alpha\_\text{retry} + \gamma\_\text{delay} + (1 - 2 \times \text{success}(t))) \times \alpha\_\text{success} \quad \text{Equation (2)}$$

In Equation (2), success(t) is "1" in a case where the previous retry is successful and is "0" in a case where the previous retry fails.

The connection unit 32 waits for the calculated retry interval in Block 1920, and thereafter re-transmits (retries) the I/O request to the node module 54 that is the access target in Block 1912.

In a case where a busy response has not been received in Block 1914, the connection unit 32 determines whether or not a completion response has been received in Block 1922. In a case where the completion response has not been received, in Block 1914, the connection unit 32 determines whether or not a busy response has been received again. In other words, after the transmission of the I/O request, the connection unit 32 waits for the reception of a busy response or a completion response.

In a case where the completion response has been received, the connection unit 32 stores the NM information for each node module in the memory 74 in Block 1924. The connection unit 32 determines whether or not another I/O request for the node module 54 that is the access target is stored in the queue of the memory 74 in Block 1926. In a case where another I/O request is stored in the queue, the connection unit 32 transmits another I/O request to the node module 54 in Block 1912. On the other hand, in a case where another I/O request is not stored in the queue, the process ends.

According to the third embodiment, the NM information included in the response includes the item representing the success/failure of retry, the connection unit 32 stores the received NM information for each node module, and the retry interval is determined through learning. Therefore, also in a case where there is a variation in the operation speed of the nonvolatile semiconductor memory, a retry interval that is optimal for each node module can be acquired.

Fourth Embodiment

In the embodiments described above, while the performance of the storage system 16 is improved by adjusting the retry interval based on the NM information supplied from the node module 54, a fourth embodiment will be described in which the performance of a storage system 16 is improved by changing a connection port of a connection unit 32 based on response information supplied from a node module 54. The connection unit 32 includes a plurality of, for example, two connection ports, and the connection ports are directly connected to two mutually-different routing circuits 52.

Figure 20:
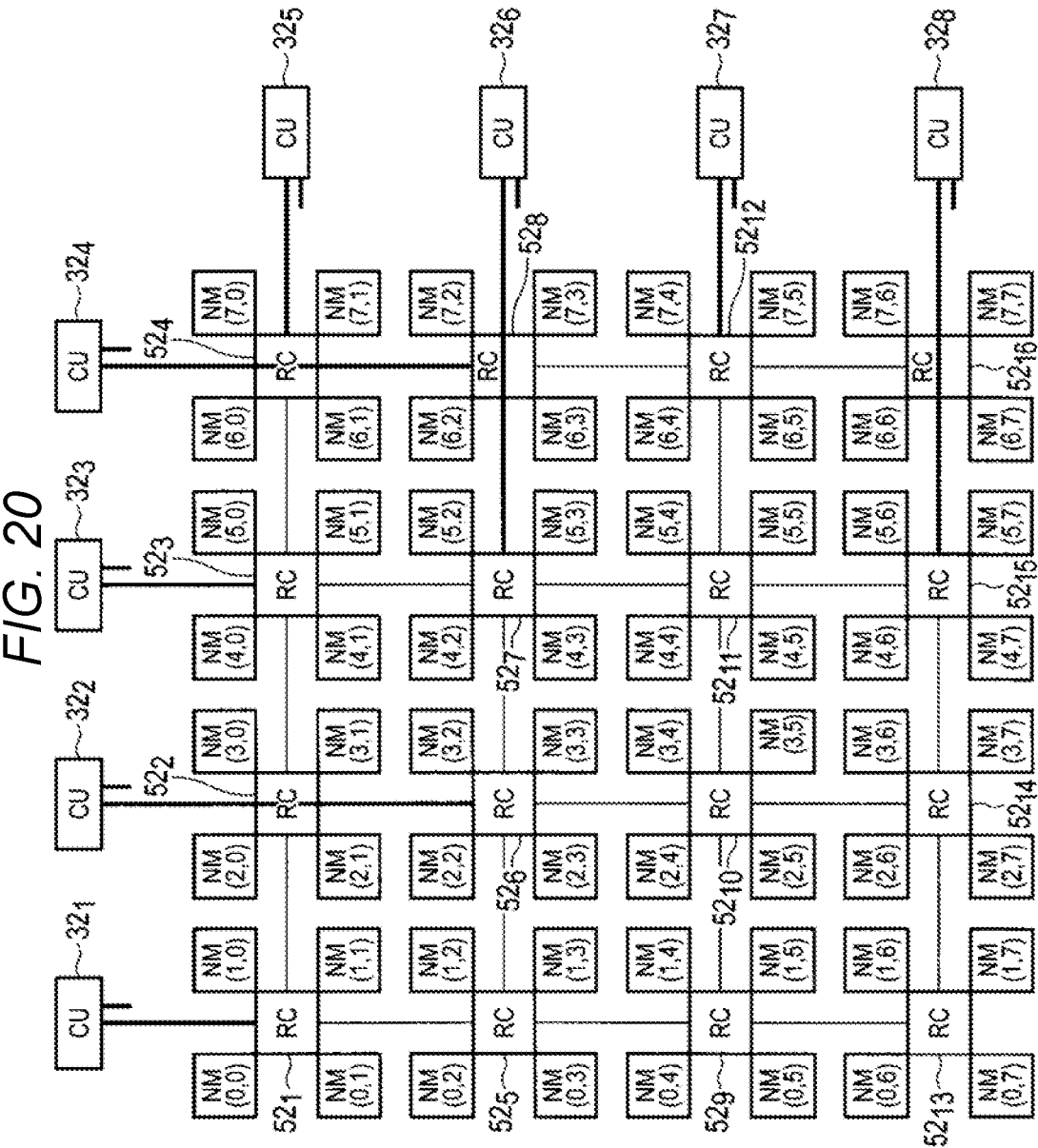
FIG. 20 illustrates an example of a state of a storage unit according to the third embodiment.

FIG. 20 illustrates an example of connection of first ports of connection units $32_1$, $32_2$, $32_3$, $32_4$, $32_5$, $32_6$, $32_7$, and $32_8$. The first port of the connection unit $32_1$ is connected to a routing circuit $52_1$ that manages NM(0, 0) to NM(1, 1), the first port of the connection unit $32_2$ is connected to a routing circuit $52_6$ that manages NM(2, 2) to NM(3, 3), the first port of the connection unit $32_3$ is connected to a routing circuit $52_3$ that manages NM(4, 0) to NM(5, 1), the first port of the connection unit $32_4$ is connected to a routing circuit $52_8$ that manages NM(6, 2) to NM(7, 3), the first port of the connection unit $32_5$ is connected to a routing circuit $52_4$ that manages NM (6, 0) to NM(7, 1), the first port of the connection unit $32_6$ is connected to a routing circuit $52_7$ that manages NM(4, 2) to NM (5, 3), the first port of the connection unit $32_7$ is connected to a routing circuit $52_{12}$ that manages NM(6, 4) to NM(7, 5), and the first port of the connection unit $32_8$ is connected to a routing circuit $52_{15}$ that manages NM(4, 6) to NM(5, 7).

Figure 21:
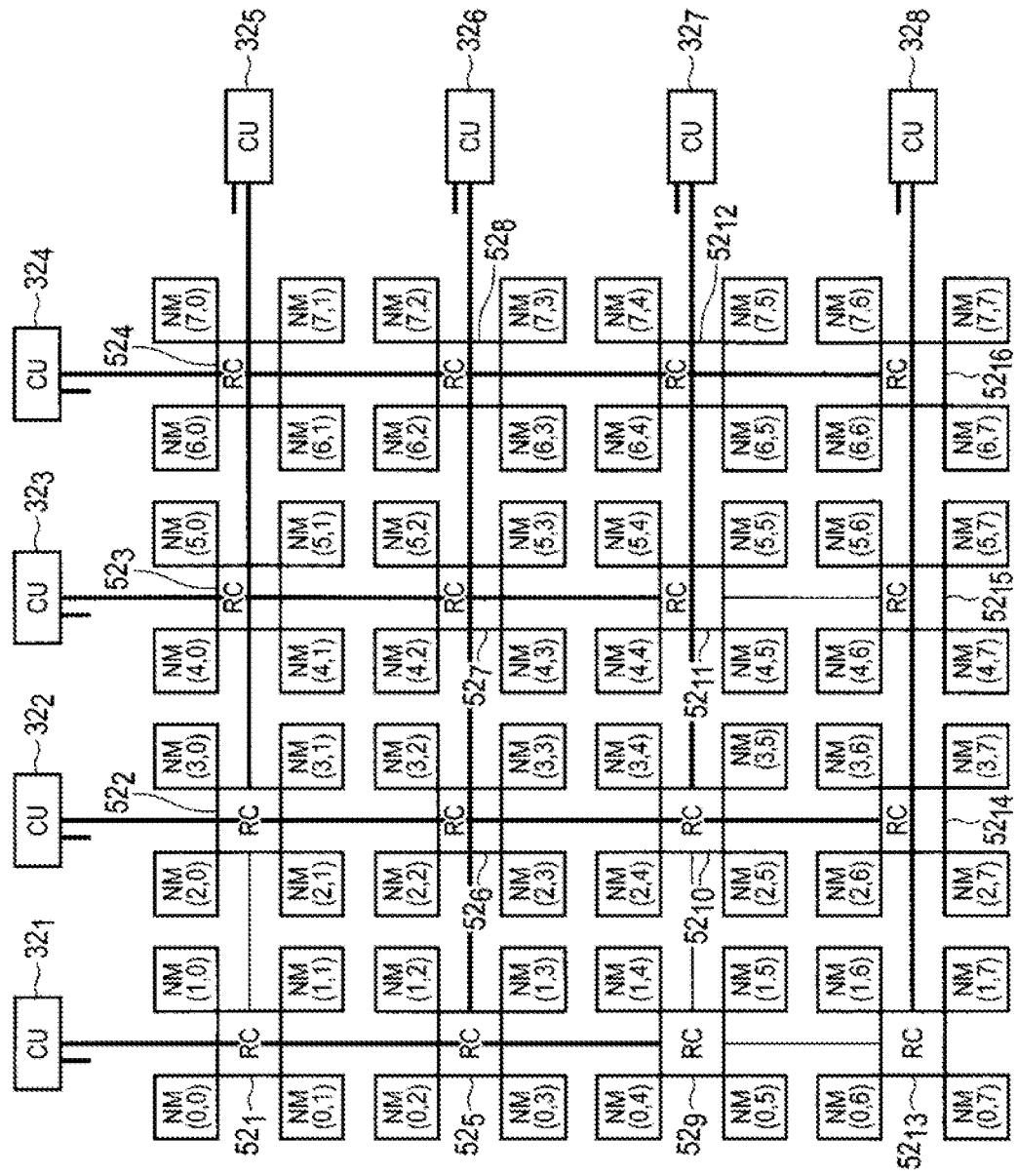
FIG. 21 illustrates another example of the state of the storage unit according to the third embodiment.

FIG. 21 illustrates an example of connection of second ports of the connection units $32_1$, $32_2$, $32_3$, $32_4$, $32_5$, $32_6$, $32_7$, and $32_8$. The second port of the connection unit $32_1$ is connected to a routing circuit $52_5$ that manages NM(0, 4) to NM(1, 5), the second port of the connection unit $32_2$ is connected to a routing circuit $52_{14}$ that manages NM(2, 5) to NM(3, 7), the second port of the connection unit $32_3$ is connected to a routing circuit $52_{11}$ that manages NM(4, 4) to NM(5, 5), the second port of the connection unit $32_4$ is connected to a routing circuit $52_{16}$ that manages NM(6, 6) to NM(7, 7), the second port of the connection unit $32_5$ is connected to a routing circuit $52_2$ that manages NM(2, 0) to NM(3, 1), the second port of the connection unit $32_6$ is connected to a routing circuit $52_9$ that manages NM (0, 2) to NM(1, 3), the second port of the connection unit $32_7$ is connected to a routing circuit $52_{10}$ that manages NM(2, 4) to NM(3, 5), and the second port of the connection unit $32_8$ is connected to a routing circuit $52_{13}$ that manages NM(0, 6) to NM(1, 7).

Figure 22:
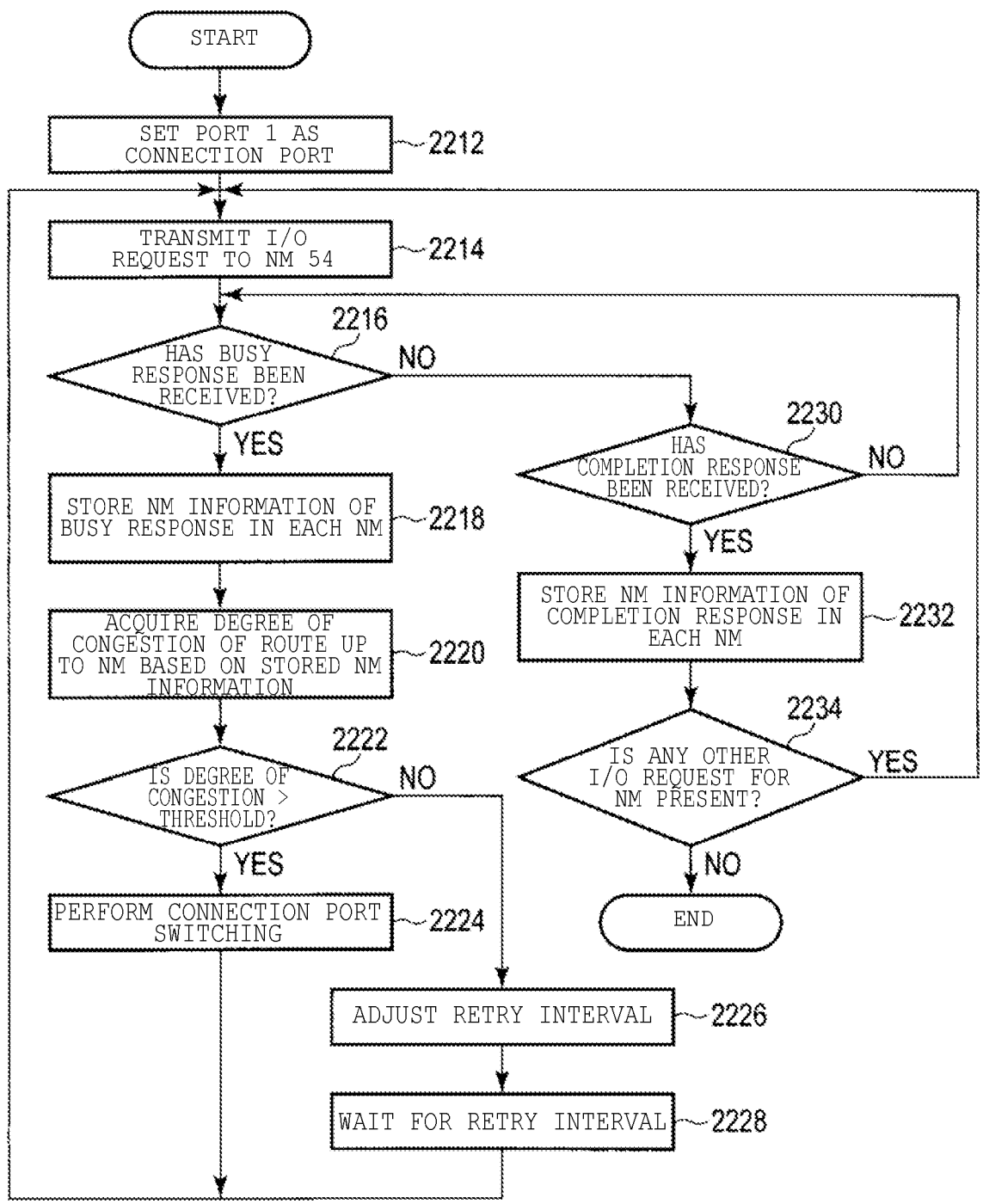
FIG. 22 is a flowchart of a process performed by a connection unit relating to an I/O request according to a fourth embodiment.

FIG. 22 is a flowchart of the operation of the connection unit 32. Since an example of the operation of the node module 54 is the same as that of the embodiments described above, the flowchart thereof is not illustrated.

The connection unit 32 that has received a command directing to access the storage unit 30 from a client 10 sets one port, for example, the first port as a connection port in Block 2212, and transmits an I/O request (a write request or a read request) to a node module 54 that is an access target in Block 2214. The node module 54, as illustrated in FIG. 11, determines whether or not the I/O request can be stored in the work memory 98, and in a case where the I/O request cannot be stored, replies a busy response, and in a case where the I/O request can be stored in the work memory 98, executes the I/O request and replies a completion response. The busy response and the completion response include NM information that also includes a consumed value of life. The consumed value of life represents the life of a packet and includes a time to live (TTL) included in an IP header and the like. The TTL is a maximum number of times of passing through a router. When a packet passes through a router or is processed once, the counter value of the TTL is decreased by one. A packet output from a connection unit 32 is removed in a PMU 90 when the counter value is decreased to be zero on an LVDS line or the PMU 90. There are cases where a busy response is replied for the transmission of a retry packet.

The connection unit 32 determines whether or not a busy response has been received in Block 2216. In a case where a busy response also including the success/failure of retry has been received, the connection unit 32 stores NM information for each node module in the memory 74 in Block 2218. The connection unit 32 acquires the degree of congestion of a route up to the node module that has replied the busy response, based on the consumed value of life included in the stored NM information in Block 2220. The degree of congestion represents "a degree at which a route is congested".

The connection unit 32 determines whether or not the degree of congestion is a threshold or more in Block 2222. In a case where the degree of congestion is the threshold or more, the connection unit 32 performs switching of the connection port in Block 2224. In this case, the connection port is switched from the first port to the second port. Thereafter, the connection unit 32 re-transmits the I/O request in Block 2214.

In a case where the node module 54 is in the busy state, there is a high possibility that the routing circuit 52 to which the node module 54 is connected or a network connected to the routing circuit 52 is also in the busy state. For this reason, there are cases where an I/O request desired to be transmitted from a certain connection unit 32 to another node module that is not in the busy state through the routing circuit 52 to which the node module 54 in the busy state is connected is blocked by the node module 54 in which the network is in a congested state due to the packet". In the case of no arrival of the packet, the packet is removed by the PMU 90 when the consumed value of the life becomes zero. In addition, since a response is not received by the connection unit 32, the connection unit 32 cancels the request due to time-out.

In such a case, by switching the connection port, the node module 54 that is in the busy state is got round. As a result, there is no blocking of the I/O request.

On the other hand, in a case where the degree of congestion is not the threshold or more, the connection unit 32, similar to Block 1016 according to the first embodiment illustrated in FIG. 10, may adjust the retry interval in Block 2226. The connection unit 32 waits for the calculated retry interval in Block 2228, and thereafter re-transmits (retry) the I/O request to the node module 54 that is the access target in Block 2214.

In Block 2216, in a case where the busy response has not been received, the connection unit 32 determines whether or not a completion response has been received in Block 2230. In a case where the completion response has not been received, the connection unit 32 determines whether or not a busy response has been received again in Block 2216. In other words, after the transmission of an I/O request, the connection unit 32 waits for the reception of a busy response or a completion response.

In a case where the completion response has been received, the connection unit 32 stores the NM information for each node module in the memory 74 in Block 2232. The connection unit 32 determines whether or not another I/O request for the node module 54 that is the access target is stored in the queue of the memory 74 in Block 2234. In a case where another I/O request is stored in the queue, the connection unit 32 transmits another I/O request to the node module 54 in Block 2214. On the other hand, in a case where another I/O request is not stored in the queue, the process ends.

Here, the switching between connection ports is not limited to a case where a busy response is received, and may be performed also in a case where a completion response is received when the consumed value of the life is the threshold or more.

Figure 23:
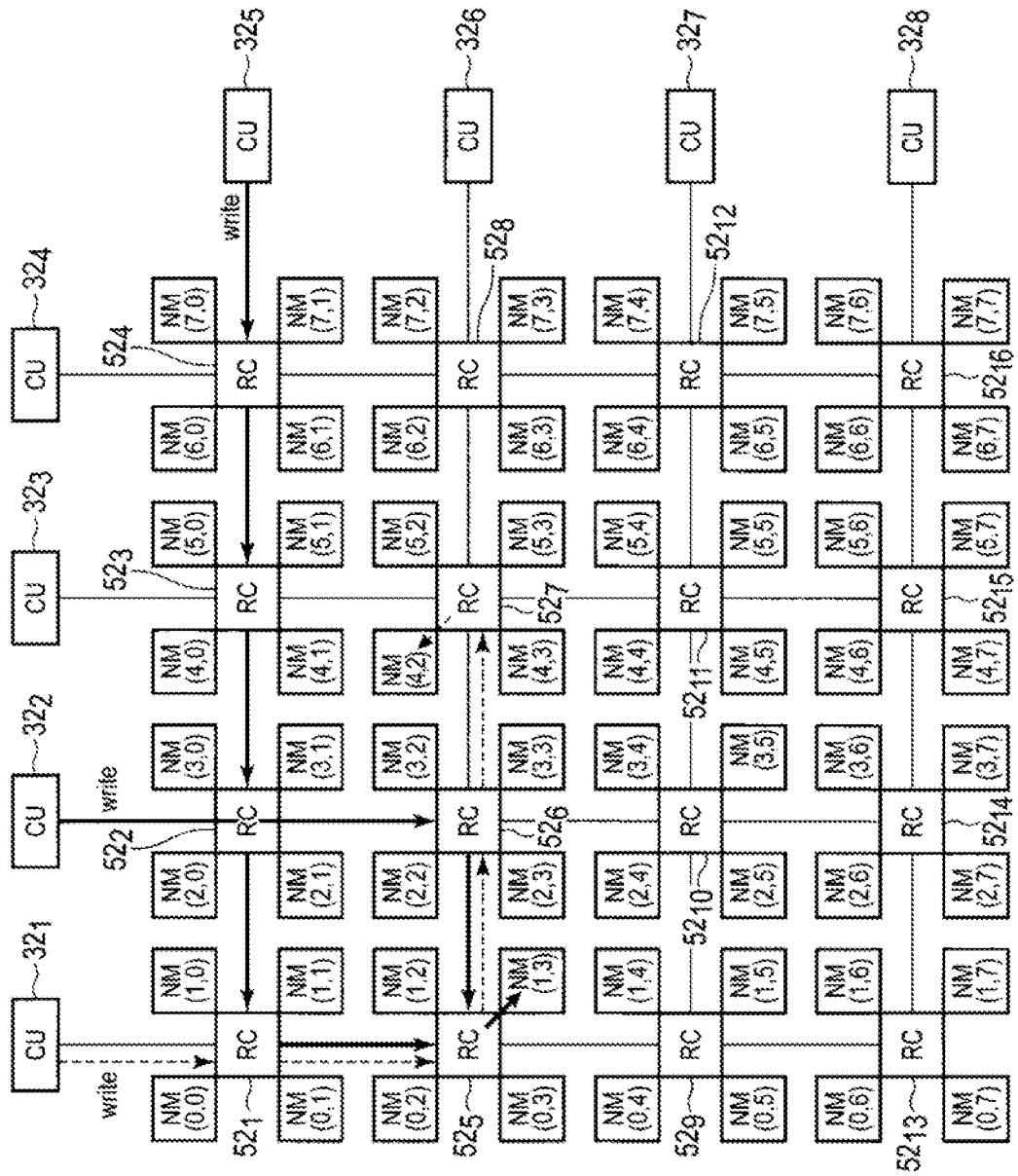
FIG. 23 illustrates an example of the state of a storage unit according to the fourth embodiment.
Figure 24:
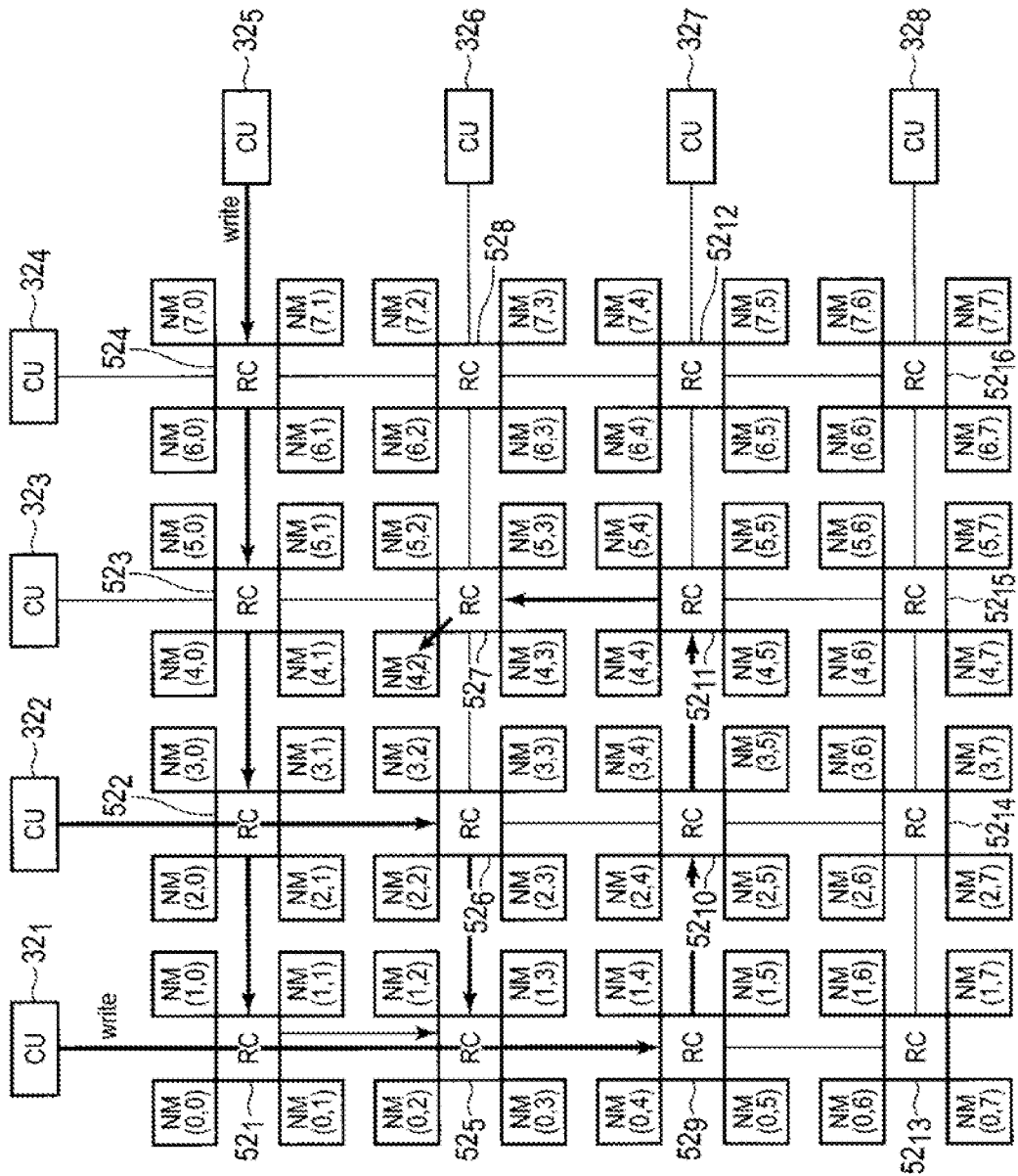
FIG. 24 illustrates another example of the state of the storage unit according to the fourth embodiment.

FIGS. 23 and 24 illustrate an example of the operation of the storage system 16 according to the fourth embodiment. FIG. 23 illustrates a state in which all connection units 32 set the first ports as connection ports. As illustrated in FIG. 23, when a write request from the connection unit $32_2$ for the node module NM (1, 3) and a write request from the connection unit $32_5$ for the node module NM(1, 3) are generated, the node module NM(1, 3) turns into the busy state. In a case where a write request from another connection unit $32_1$ for the node module NM(4, 2) is generated, this write request, as denoted by a broken line in FIG. 23, goes through the routing circuit $52_5$ to which the node module NM(1, 3) in the busy state is connected, and accordingly does not arrive at the node module NM(4, 2) that is the transmission destination in a case where the routing circuit $52_5$ is in the busy state.

Here, the connection unit $32_1$ refers to the consumed value of the life of the response, and in a case where the degree of congestion of a route to a target node is the threshold or more, switches the connection port to the second port. For this reason, as illustrated in FIG. 24, the write request for the node module NM (4, 2) is directly transmitted from the second port of the connection unit $32_1$ to the routing circuit $52_9$, and does not go through the routing circuit $52_5$ to which the node module NM (1, 3) in the busy state is connected. For this reason, the write request is transmitted from the routing circuit $52_9$ to the node module NM(4, 2) through the routing circuits $52_{10}$, $52_{11}$, and $52_7$.

According to the fourth embodiment, in a case where the degree of congestion of the network is the threshold or more, the connection unit 32 having a plurality of connection ports transmits an I/O request by performing switching between the connection ports, whereby a routing circuit and a route that are congested can be got round. For this reason, even when I/O requests are concentrated on several node modules, routing circuits, and routes, an I/O request can be transmitted to another node module through a routing circuit and a route that are not congested.

Fifth Embodiment

In the embodiments described above, while the performance of the storage system 16 is improved by adjusting the retry interval based on the NM information supplied from the node module 54 or by performing switching between connection ports transmitting an I/O request. According to a fifth embodiment, the performance of the storage system 16 is improved by adjusting start-up timing of a background operation based on NM information supplied from a node module 54.

In a nonvolatile semiconductor memory 98 such as a flash memory, separate from the process in response to an I/O request from a connection unit 32, a background process such as garbage collection or wear levelling is also performed. However, in a case where such a background process is performed when I/O requests are concentrated on a corresponding node, there are cases where a delay time is degraded.

According to the fifth embodiment, the execution timing of a background process is determined based on the state of the node module 54 so as to prevent such a case.

Figure 25:
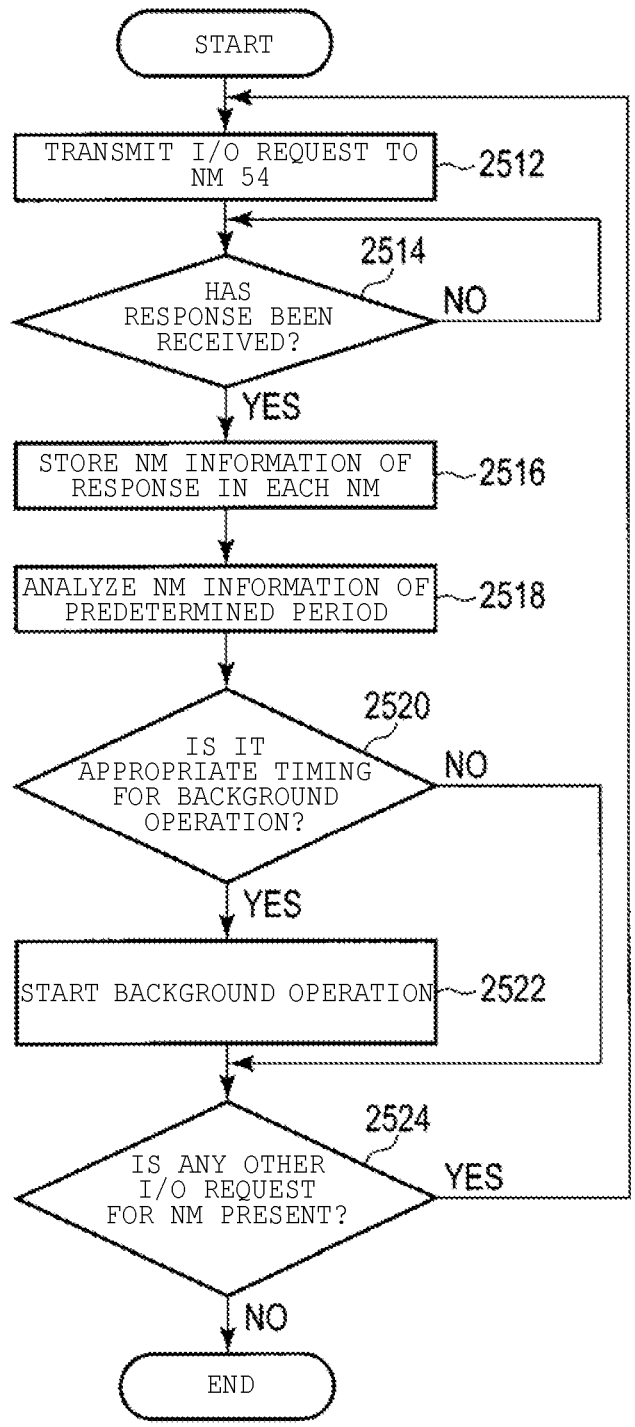
FIG. 25 is a flowchart of a process performed by a connection unit relating to an I/O request according to a fifth embodiment.

FIG. 25 is a flowchart that illustrates an example of the operation of the connection unit 32. Since an example of the operation of the node module 54 is the same as that according to the embodiment described above, the flowchart thereof will not be illustrated.

Figure 26:
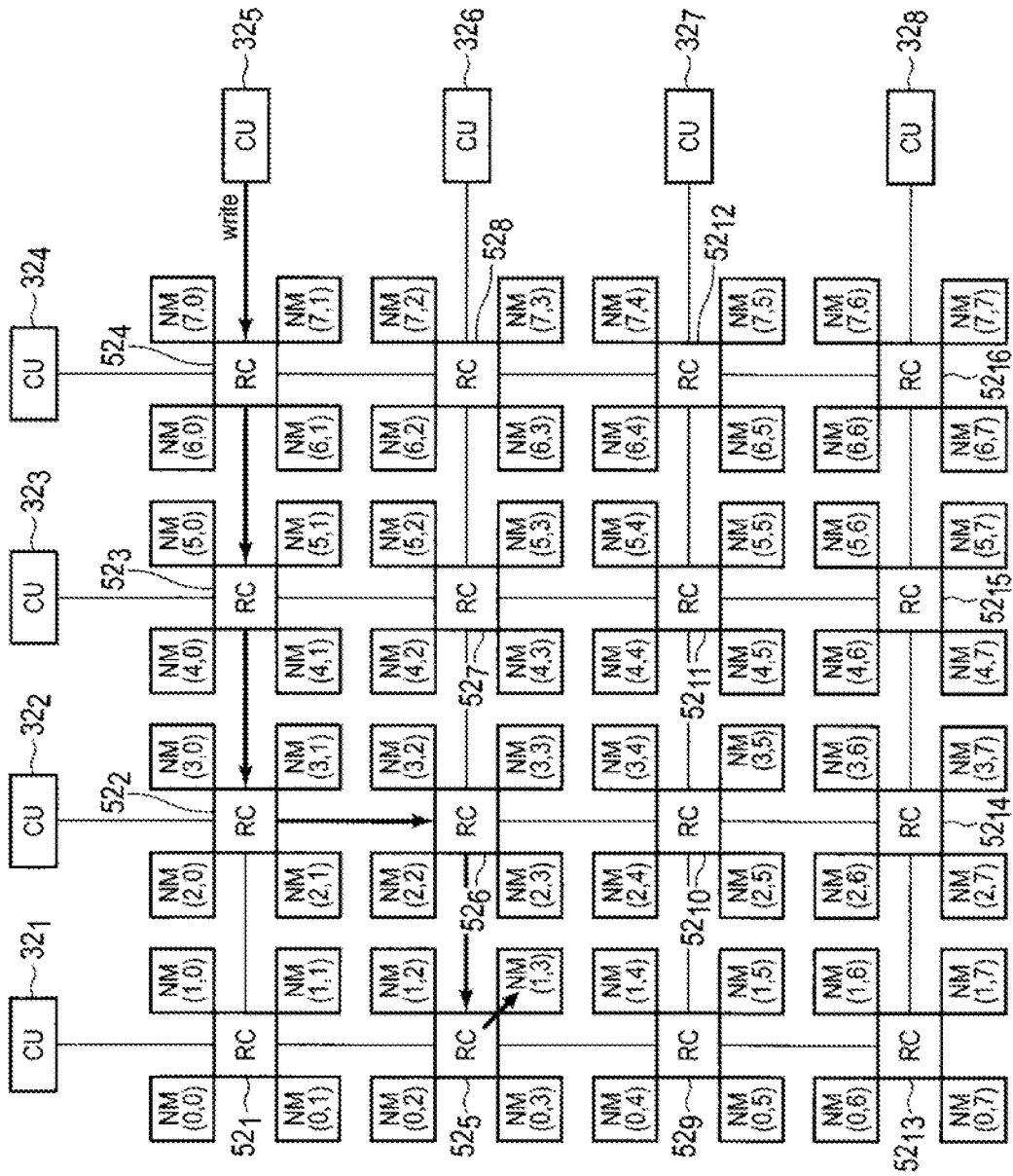
FIG. 26 illustrates a state of a storage unit according to the fifth embodiment.

The connection unit 32 that has received a command directing to access the storage unit 30 from a client 10 transmits an I/O request (a write request or a read request) to a node module 54 that is an access target in Block 2512. Here, as illustrated in FIG. 26, an I/O request is transmitted from a connection unit $32_5$ to a node module NM(1, 3) connected to a routing circuit $52_5$.

Figure 27:
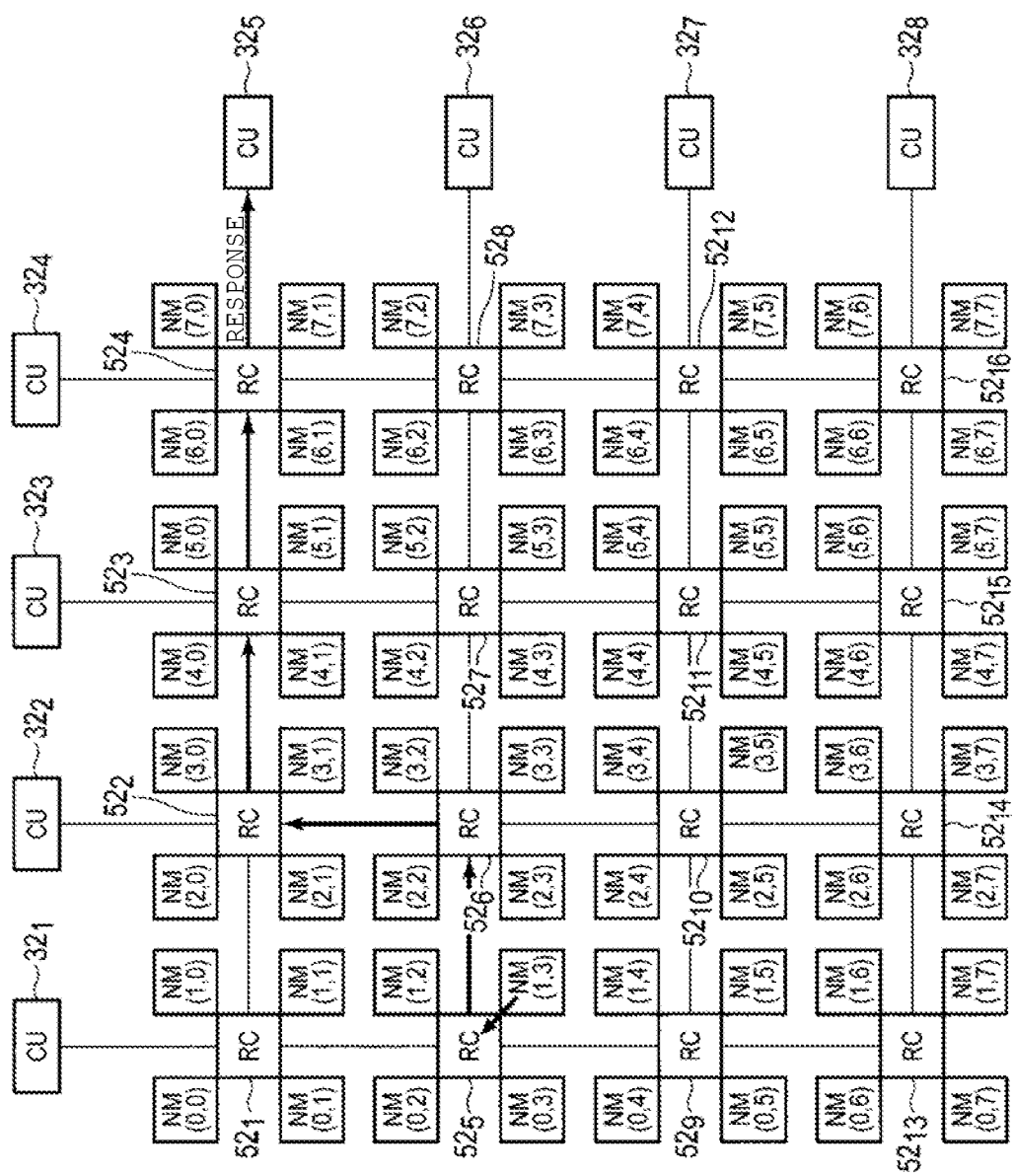
FIGS. 27 and 28 each illustrate another state of the storage unit according to the fifth embodiment.

The node module 54, as illustrated in FIG. 11, determines whether or not the I/O request can be stored in the work memory 98. In a case where the I/O request cannot be stored, the node module 54 replies a busy response, and in a case where the I/O request can be stored in the work memory 98, the node module 54 executes the I/O request and replies a completion response. Here, as illustrated in FIG. 27, a response is transmitted from a node module NM(1, 3) connected to a routing circuit $52_5$ to a connection unit $32_5$.

The connection unit 32 determines whether or not a busy response has been received in Block 2514. In a case where the busy response has been received, the connection unit 32 stores the NM information for each node module in the memory 74 in Block 2516. The NM information is stored in the memory 74 for a predetermined period (for example, several tens of seconds or several minutes). The connection unit 32 analyzes the NM information of the predetermined period in Block 2518, and in Block 2520, determines whether or not it is appropriate timing to perform a background process based on a result of the analysis and the number of I/O requests, which are stored in the queue, transmitted to the node module 54. Here, the appropriate timing to perform a background process, for example, is a case where the number of requests stored in the memory 74 is small (not in the busy state), a case where the consumed life value included in the NM information is small (the degree of congestion is low), or a case where the number of I/O requests, which are stored in the queue of the connection unit 32, transmitted to the node module 54 is small.

Figure 28:
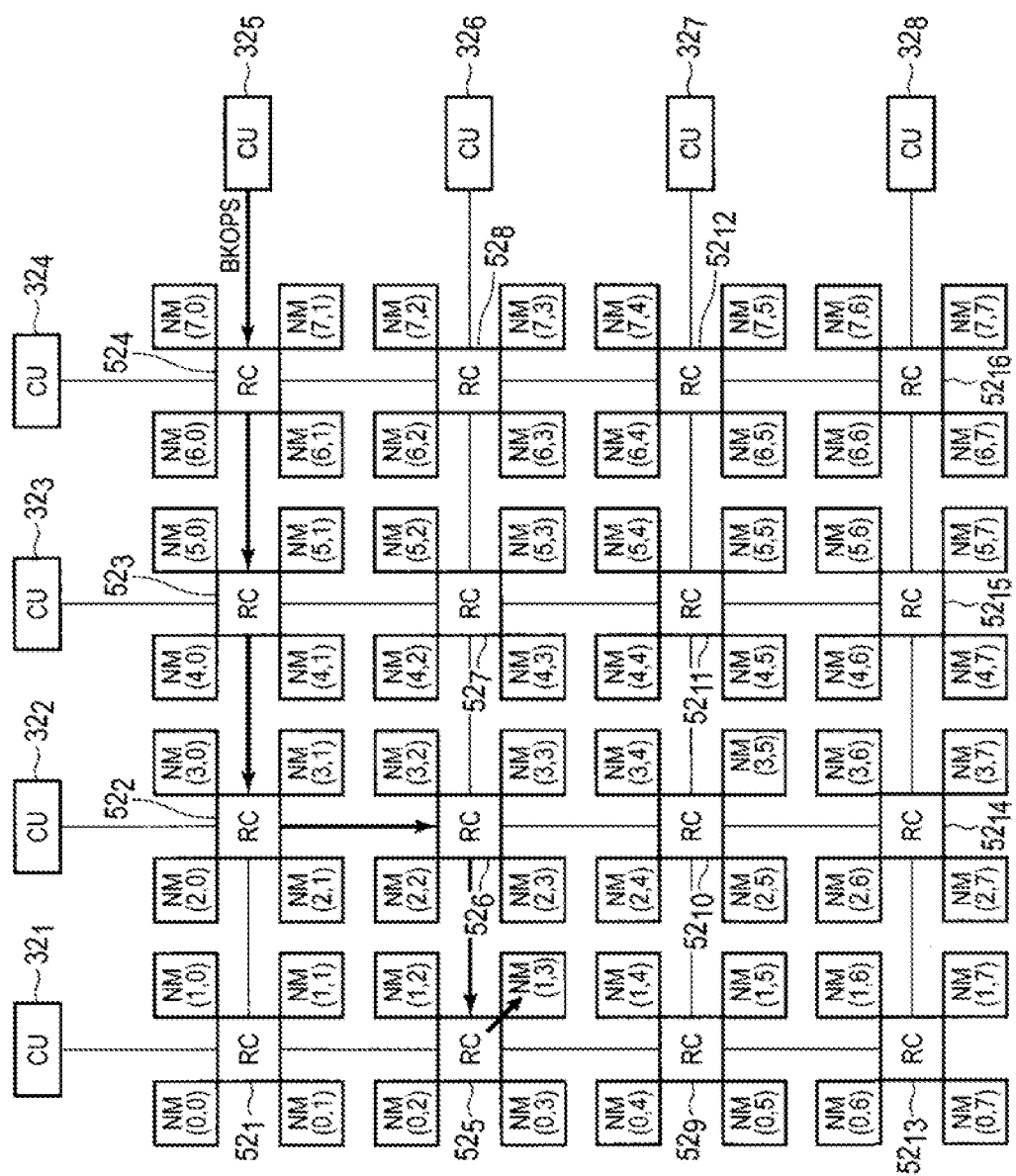

In a case where it is determined to be appropriate timing to perform a background process, in Block 2522, as illustrated in FIG. 28, the connection unit $32_5$ transmits a request BKOPS directing to perform a background process such as garbage collection or wear leveling to the node module NM(1, 3) connected to the routing circuit $52_5$. On the other hand, in a case where it is determined not to be appropriately timing to perform a background process, Block 2522 is skipped. The connection unit 32 determines whether or not another I/O request for the node module 54 that is the access target is stored in the queue of the memory 74 in Block 2524. In a case where another I/O request is stored in the queue, the connection unit 32 transmits another I/O request to the node module 54 in Block 1512. On the other hand, in a case where another I/O request is not stored in the memory 74, the process ends.

According to the fifth embodiment, since the connection unit 32 monitors the status of the node module 54 in real time and starts up a background process when the processing load of the node module 54 is low based on the result, there is a low possibility that the performance of the storage system is degraded as a background operation such as garbage collection or wear levelling is operated at the time of a high load of the node module 54.

Sixth Embodiment

A sixth embodiment acquired by combining the embodiments described above will be described.

Figure 29:
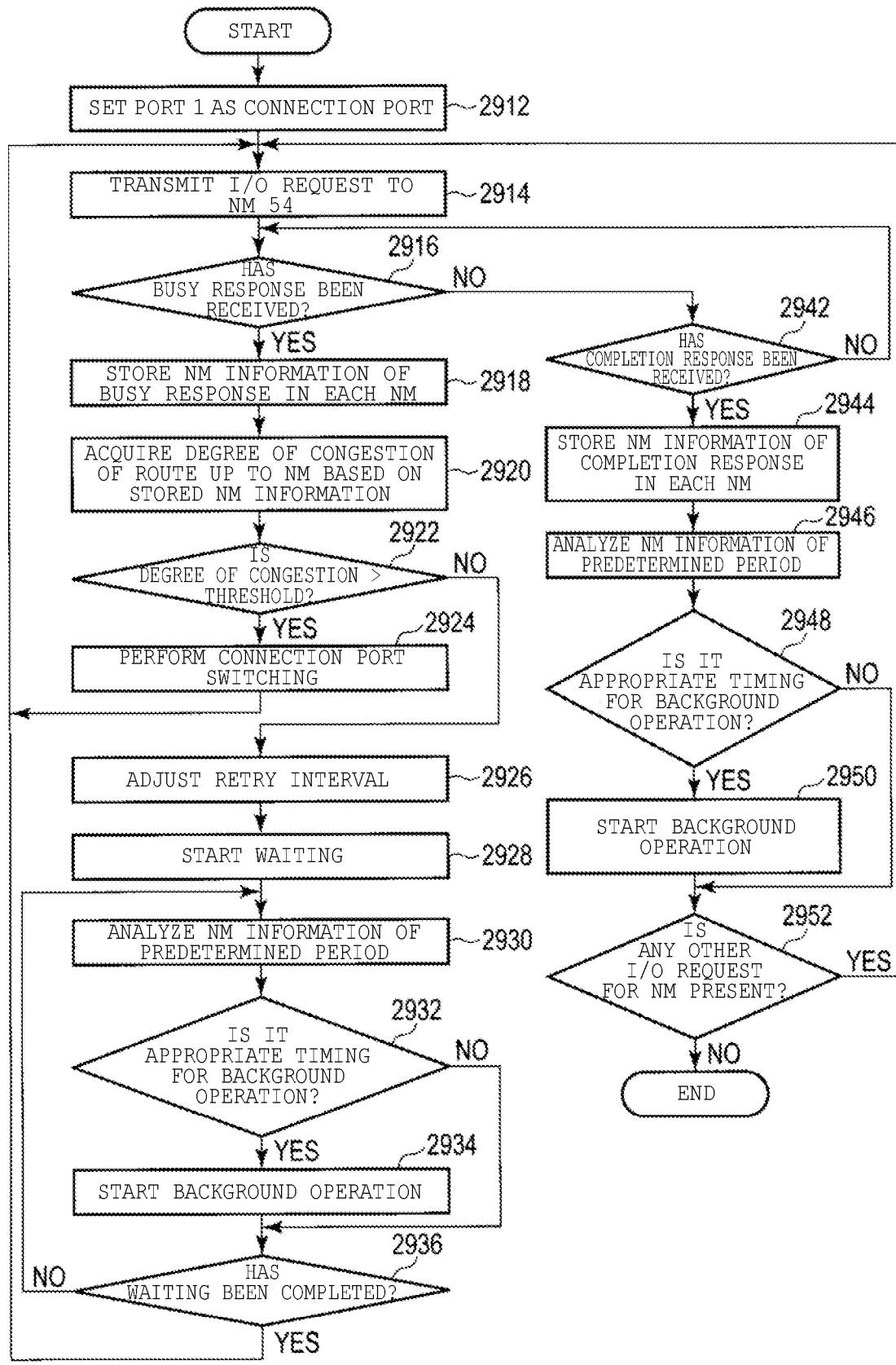
FIG. 29 is a flowchart of a process performed by a connection unit relating to an I/O request according to a sixth embodiment.

FIG. 29 is a flowchart that illustrates an example of the operation of a connection unit 32 according to the sixth embodiment.

The connection unit 32 that has received an I/O command directing to access the storage unit 30 from a client 10 sets one port, for example, the first port as a connection port in Block 2912, and transmits an I/O request (a write request or a read request) addressed to a node module 54 that is an access target in Block 2914. The node module 54 (not illustrated in the drawing) replies a busy response or a completion response after the execution of the request.

The node module 54 determines whether or not a busy response has been received in Block 2916. In a case where the busy response has been received, the connection unit 32 stores NM information of the busy response for each node module in the memory 74 in Block 2918. The connection unit 32 acquires the degree of congestion of a route up to the node module that has replied the busy response, based on the consumed value of life included in the stored NM information, in Block 2920. The connection unit 32 determines whether or not the degree of congestion is a threshold or more in Block 2922. In a case where the degree of congestion is the threshold or more, the connection unit 32 performs switching of the connection port in Block 2924. In this case, the connection port is switched from the first port to the second port. Thereafter, the connection unit 32 re-transmits the I/O request in Block 2914.

On the other hand, in a case where the degree of congestion is not the threshold or more, the connection unit 32, similarly to Block 1016 according to the first embodiment illustrated in FIG. 10, adjusts the retry interval in Block 2926. The connection unit 32 turns into the waiting mode in Block 2928, analyzes the NM information of a predetermined period stored in the memory 74 in Block 2930, and determines whether or not it is appropriate timing to perform a background process based on a result of the analysis and the number of I/O requests, which are stored in the queue, transmitted to the node module 54 in Block 2932.

In a case where it is determined to be appropriate timing to perform a background process, in Block 2934, the connection unit 32 transmits a request directing to perform a background process such as garbage collection or wear leveling. On the other hand, in a case where it is determined not to be appropriately timing to perform a background process, Block 2934 is skipped. The connection unit 32, in Block 2936, determines whether or not the waiting time arrives at the retry interval calculated in Block 2926. In a case where the waiting time does not arrive at the retry interval, Block 2930 is performed again, and in a case where the waiting time arrives at the retry interval, a next I/O request is transmitted in Block 2914.

In a case where a busy response has not been received, the connection unit 32 determines whether or not a completion response has been received in Block 2942. In a case where the completion response has not been received, in Block 2916, the connection unit 32 determines whether or not a busy response has been received again. In other words, after the transmission of the I/O request, the connection unit 32 waits for the reception of a busy response or a completion response.

In a case where the completion response has been received, the connection unit 32 stores the NM information for each node module in the memory 74 in Block 2944. The connection unit 32 analyzes the NM information of a predetermined period stored in the memory 74 in Block 2946, and in Block 2948, determines whether or not it is appropriate timing to perform a background process based on a result of the analysis and the number of I/O requests, which are stored in the queue, transmitted to the node module 54.

In a case where it is determined to be appropriate timing to perform a background process, in Block 2950, the connection unit 32 transmits a request directing to perform a background process such as garbage collection or wear leveling. On the other hand, in a case where it is determined not to be appropriately timing to perform a background process, Block 2950 is skipped.

The connection unit 32 determines whether or not another I/O request for the node module 54 that is the access target is stored in the queue of the memory 74 in Block 2952. In a case where another I/O request is stored in the queue, the connection unit 32 transmits another I/O request to the node module 54 in Block 2914. On the other hand, in a case where another I/O request is not stored in the memory 74, the process ends.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system connectable to a client device over a network, the storage system comprising:
    a plurality of nodes, each of the nodes including one or more node modules, each of which includes a nonvolatile storage; and
    a connection unit directly connectable to at least one of the nodes and configured to receive a command from the client device over the network, transmit an access request or an inquiry directed to a target node module, the access request or the inquiry corresponding to the command, determine a length of an interval before the connection unit re-transmits the access request or the inquiry, based on a response indicating an operation status of the target node module, which is returned by the target node module in response to the access request or the inquiry, and re-transmits the access request or the inquiry upon the connection unit determining that the interval of the determined length has passed.

2. The storage system according to claim 1, wherein
each node module further includes a volatile memory in which data to be written into the nonvolatile storage of the node module or data read from the nonvolatile storage of the node module are temporarily stored, and the target node module returns a response indicating that the target node module is busy when the volatile memory of the target node module cannot store further data.

3. The storage system according to claim 2, wherein
the target node module returns a response indicating that the target node module is not busy in response to the inquiry when the volatile memory of the target node module can store further data.

4. The storage system according to claim 2, wherein
the target node module returns a response indicating that access in response to the access request is completed when the volatile memory of the target node module can store further data and the access is completed.

5. The storage system according to claim 2, wherein
the connection unit determines the length of the interval selectively when the response indicates that the target node module is busy.

6. The storage system according to claim 1, wherein
the connection unit determines the length of the interval also based on a previously-determined length of the interval.

7. The storage system according to claim 1, wherein
the connection unit determines the length of the interval also based on previously-returned responses from the target node module.

8. The storage system according to claim 1, wherein
the connection unit is further configured to determine a congestion degree between the connection unit and a node including the target node module, based on the response when the response indicates that the target node module is busy.

9. The storage system according to claim 8, wherein
the connection unit is directly connectable to selected one of a plurality of nodes, and
when the determined congestion degree is above a threshold, the connection unit switches a node directly connected thereto.

10. The storage system according to claim 1, further comprising:
the plurality of nodes includes a first node that is directly connectable to the connection unit and a second node that is directly connected to the first node and not directly connectable to the connection unit, and
the first node is configured to receive the access request or the inquiry transmitted from the connection unit, determine whether or not the target node module is included in the first node, and transfer the received access request or inquiry to the second node when determining that the target node module is not included in the first node.

11. The storage system according to claim 10, wherein
the first node is configured to, when determining that the target node module is included in the first node, transfer the access request or the inquiry transmitted from the connection unit to the target node module therein.

12. The storage system according to claim 11, wherein
the access request or the inquiry includes coordinates of the target node modules, and
the first node determines whether or not the target node module is included in the first node based on whether or not the coordinates of the target module match coordinates of one of the one or more node modules included in the first node.

13. A method of operating a storage system connectable to a client device over a network, the storage system including a plurality of nodes, each of the nodes including one or more node modules each of which includes a nonvolatile storage, and a connection unit directly connectable to at least one of the nodes, the method comprising:
receiving a command from the client device over the network;
transmitting, from the connection unit, an access request or an inquiry directed to a target node module, the access request or the inquiry corresponding to the command;
determining, by the connection unit, a length of an interval before the connection unit re-transmits the access request or the inquiry, based on a response indicating an operation status of the target node module, which is returned by the target node module in response to the access request or the inquiry;
determining, by the connection unit, that the interval of the determined length has passed; and
re-transmitting, by the connection unit, the access request or the inquiry upon determining by the connection unit, that the interval of the determined length has passed.

14. The method according to claim 13, wherein
each node module further includes a volatile memory in which data to be written into the nonvolatile storage of the node module or data read from the nonvolatile storage of the node module are temporarily stored, and the method further comprises:
returning, from the target node module, a response indicating that the target node module is busy when the volatile memory of the target node module cannot store further data.

15. The method according to claim 14, further comprising:
returning, from the target node module, a response indicating that the target node module is not busy in response to the inquiry when the volatile memory of the target node module can store further data.

16. The method according to claim 14, further comprising:
returning, from the target node module, a response indicating that access in response to the access request is completed when the volatile memory of the target node module can store further data and the access is completed.

17. The method according to claim 14, wherein
the length of the interval is determined selectively when the response indicates that the target node module is busy.

18. The method according to claim 13, wherein
the length of the interval is determined also based on a previously-determined length of the interval.

19. The method according to claim 13, wherein
the length of the interval is determined also based on previously-returned responses from the target node module.

20. The method according to claim 13, further comprising:
determining a congestion degree between the connection unit and a node including the target node module, based on the response when the response indicates that the target node module is busy.

* * * * *